US012555539B2

(12) United States Patent
Hu et al.

(10) Patent No.: US 12,555,539 B2
(45) Date of Patent: Feb. 17, 2026

(54) PIXEL CIRCUIT AND DRIVING METHOD THEREOF, DISPLAY PANEL, AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Ming Hu, Beijing (CN); Wenhui Gao, Beijing (CN); Yonglin Guo, Beijing (CN); Ziyang Yu, Beijing (CN); Tiaomei Zhang, Beijing (CN); Miao Wang, Beijing (CN); Quanyong Gu, Beijing (CN); Shilong Wang, Beijing (CN); Jingwen Zhang, Beijing (CN); Jian Li, Beijing (CN); Jianpeng Wu, Beijing (CN); Tianyi Cheng, Beijing (CN); Zhiliang Jiang, Beijing (CN); Gukhwan Song, Beijing (CN); Hai Zheng, Beijing (CN); Haigang Qing, Beijing (CN); Xiangdan Dong, Beijing (CN); Yi Zhang, Beijing (CN); Rui Wang, Beijing (CN); Taofeng Xie, Beijing (CN); Haijun Qiu, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/993,122

(22) PCT Filed: May 15, 2024

(86) PCT No.: PCT/CN2024/093251
§ 371 (c)(1),
(2) Date: Jan. 10, 2025

(87) PCT Pub. No.: WO2025/001587
PCT Pub. Date: Jan. 2, 2025

(65) Prior Publication Data

US 2026/0004729 A1 Jan. 1, 2026

(30) Foreign Application Priority Data

Jun. 30, 2023 (CN) ......................... 202310799140.9

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0804* (2013.01);
(Continued)

(58) Field of Classification Search
CPC .. G09G 3/3233; G09G 3/3266; G09G 3/3291; G09G 3/3258; G09G 3/3225;
(Continued)

(56) References Cited

U.S. PATENT DOCUMENTS

2013/0127932 A1* 5/2013 Han ..................... G09G 3/3233 345/212
2017/0116918 A1* 4/2017 Dong ....................... G09G 3/20
(Continued)

FOREIGN PATENT DOCUMENTS

CN 112397026 A 2/2021
CN 113516951 A 10/2021
(Continued)

*Primary Examiner* — Dong Hui Liang
(74) *Attorney, Agent, or Firm* — The Webb Law Firm

(57) ABSTRACT

A pixel circuit includes a driving sub-circuit, a compensation sub-circuit, a reset sub-circuit and a storage sub-circuit. The driving sub-circuit is configured to control a circuit
(Continued)

brand between a second node and a third node to be closed and opened under control of a voltage of a first node. The compensation sub-circuit is configured to control a circuit branch between the first node and the third node to be closed and opened in response to a first scanning signal received at a first scanning signal terminal. The reset sub-circuit is configured to transmit a first initialization signal received at a first initialization signal terminal to the first node in response to a reset signal received at a reset signal terminal. The storage sub-circuit is configured to store voltages of the first node and the second node.

20 Claims, 10 Drawing Sheets

(52) U.S. Cl.
CPC ............... *G09G 2300/0819* (2013.01); *G09G 2300/0852* (2013.01); *G09G 2300/0861* (2013.01); *G09G 2310/0286* (2013.01); *G09G 2310/08* (2013.01); *G09G 2320/0233* (2013.01); *G09G 2320/0247* (2013.01); *G09G 2320/0257* (2013.01)

(58) Field of Classification Search
CPC .......... G09G 3/32; G09G 3/3208; G09G 3/20; G09G 3/30; G09G 3/3275; G09G 2300/0819; G09G 2300/0861; G09G 2300/0842; G09G 2300/0426; G09G 2300/0852; G09G 2300/0866; G09G 2300/0814; G09G 2300/043; G09G 2300/0809; G09G 2300/0452; G09G 2320/0233; G09G 2320/043; G09G 2320/045; G09G 2320/0223; G09G 2320/0238; G09G 2320/0247; G09G 2310/0251; G09G 2310/08; G09G 2310/02632; G09G 2310/061; G09G 2310/0256; G09G 2330/021; G09G 2330/028
See application file for complete search history.

(56) References Cited

U.S. PATENT DOCUMENTS

| | | | | |
|---|---|---|---|---|
| 2017/0287402 A1* | 10/2017 | Toyomura | ............ | G09G 3/3258 |
| 2018/0301092 A1* | 10/2018 | Ma | ........................ | G09G 3/3258 |
| 2021/0118371 A1* | 4/2021 | Qing | .................... | G09G 3/3233 |
| 2022/0199013 A1* | 6/2022 | Matsueda | ............ | G09G 3/3233 |
| 2023/0215353 A1* | 7/2023 | Zhang | .................. | G09G 3/3233<br>345/204 |

FOREIGN PATENT DOCUMENTS

| | | | |
|---|---|---|---|
| CN | 113990259 | A | 1/2022 |
| CN | 114842806 | A | 8/2022 |
| CN | 115376461 | A | 11/2022 |
| KR | 1020210084097 | A | 7/2021 |
| WO | 2024000547 | A1 | 1/2024 |

* cited by examiner

PIXEL CIRCUIT AND DRIVING METHOD THEREOF, DISPLAY PANEL, AND DISPLAY DEVICE

CROSS-REFERENCE TO RELATED APPLICATIONS

This application is the United States national phase of International Patent Application No. PCT/CN2024/093251, filed May 15, 2024, and claims priority to Chinese Patent Application No. 202310799140.9, filed Jun. 30, 2023, the disclosures of which are hereby incorporated by reference in their entireties.

BACKGROUND OF THE INVENTION

Field of the Invention

The present disclosure relates to the field of display technologies, and in particular, to a pixel circuit and a driving method thereof, a display panel, and a display device.

Description of Related Art

With the rapid development of display technologies, display devices have gradually become common in people's lives. Organic light-emitting diodes (OLEDs) are widely applied in smart products such as mobile phones, televisions and notebook computers due to advantages such as self-luminous, low power consumption, wide viewing angle, fast response, high contrast and flexible display.

SUMMARY OF THE INVENTION

In an aspect, a pixel circuit is provided. The pixel circuit includes a driving sub-circuit, a compensation sub-circuit, a reset sub-circuit and a storage sub-circuit.

The driving sub-circuit is coupled to a first node, a second node and a third node. The driving sub-circuit is configured to control a circuit branch between the second node and the third node to be closed and opened under control of a voltage of the first node.

The compensation sub-circuit is coupled to a first scanning signal terminal, the first node and the third node. The compensation sub-circuit is configured to control a circuit branch between the first node and the third node to be closed and opened in response to a first scanning signal received at the first scanning signal terminal.

The reset sub-circuit coupled to a first initialization signal terminal, a reset signal terminal and the first node. The reset sub-circuit is configured to transmit a first initialization signal received at the first initialization signal terminal to the first node in response to an operating voltage of a reset signal received at the reset signal terminal.

The storage sub-circuit is coupled to a first voltage signal terminal, the first node and the second node. The storage sub-circuit is configured to store voltages of the first node and the second node.

In some embodiments, the storage sub-circuit includes a first storage capacitor and a second storage capacitor; a first plate of the first storage capacitor is connected to the first voltage signal terminal, and a second plate of the first storage capacitor is connected to the first node; a first plate of the second storage capacitor is connected to the first voltage signal terminal, and a second plate of the second storage capacitor is connected to the second node.

In some embodiments, the compensation sub-circuit includes a first sub-transistor and a second sub-transistor that are connected in series; a first electrode of the first sub-transistor is connected to the first node, a second electrode of the first sub-transistor and/or a first electrode of the second sub-transistor is connected to a fourth node, a second electrode of the second sub-transistor is connected to the third node, and control electrodes of the first sub-transistor and the second sub-transistor are connected to the first scanning signal terminal. The pixel circuit further includes a leakage prevention sub-circuit, the leakage prevention sub-circuit is coupled to a control signal terminal, a constant voltage terminal and the fourth node, and the leakage prevention sub-circuit is configured to transmit a constant voltage signal received at the constant voltage terminal to the fourth node in response to an operating voltage of a control signal received at the control signal terminal.

In some embodiments, the pixel circuit further includes a light-emitting control sub-circuit; the light-emitting control sub-circuit is coupled to the first voltage signal terminal, an enable signal terminal, the second node, the third node and a fifth node. The fifth node is configured to be connected to an anode of a light-emitting device; the light-emitting control sub-circuit is configured to, in response to an enable signal received at the enable signal terminal, control a circuit branch between the first voltage signal terminal and the second node to be closed and opened and control a circuit branch between the third node and the fifth node to be closed and opened. Signals received at the enable signal terminal and the control signal terminal are same.

In some embodiments, the pixel circuit further includes a data writing sub-circuit, the data writing sub-circuit is coupled to a data signal terminal, a second scanning signal terminal and the second node. The data writing sub-circuit is configured to transmit a data signal received at the data signal terminal to the second node in response to a first operating voltage of a second scanning signal received at the second scanning signal terminal and transmit a data refresh signal received at the data signal terminal to the second node in response to a second operating voltage of the second scanning signal received at the second scanning signal terminal; the data refresh signal is a data signal received by a pixel circuit in another row.

In some embodiments, an end time of the first operating voltage of the second scanning signal is prior to an end time of an operating voltage of the first scanning signal; and a time interval between the end time of the first operating voltage of the second scanning signal and the end time of the operating voltage of the first scanning signal is greater than or equal to one row scanning period. The row scanning period is a duration of an operating voltage of the second scanning signal.

In some embodiments, a start time of the first operating voltage of the second scanning signal is after an end time of the operating voltage of the reset signal; and a time interval between the start time of the first operating voltage of the second scanning signal and the end time of the operating voltage of the reset signal is greater than or equal to 1 row scanning period. The row scanning period is a duration of an operating voltage of the second scanning signal.

In some embodiments, transistors included in the compensation sub-circuit are P-type transistors; a duration of an operating voltage of the first scanning signal is greater than or equal to 4 row scanning periods; an operating voltage of the first scanning signal in a first row scanning period is greater than an operating voltage of the first scanning signal in a second row scanning period; and a period in which the second scanning signal is at the first operating voltage coincides with a 2N-th row scanning period in which the first scanning signal is at the operating voltage, where N≥2 and N is an integer.

In some embodiments, the pixel circuit further includes a light-emitting control sub-circuit coupled to the first voltage signal terminal, an enable signal terminal, the second node, the third node and a fifth node; the fifth node is configured to be connected to an anode of a light-emitting device; the light-emitting control sub-circuit is configured to, in response to an enable signal received at the enable signal terminal, control a circuit branch between the first voltage signal terminal and the second node to be closed and opened and control a circuit branch between the third node and the fifth node to be closed and opened; a start time and an end time of the second operating voltage of the second scanning signal are both between an end time of an operating voltage of the first scanning signal and a start time of an operating voltage of the enable signal; and a time interval between the start time of the second operating voltage of the second scanning signal and the end time of the operating voltage of the first scanning signal is greater than or equal to one row scanning period; and a time interval between the end time of the second operating voltage of the second scanning signal and the start time of the operating voltage of the enable signal is greater than or equal to one row scanning period. The row scanning period is a duration of an operating voltage of the second scanning signal.

In some embodiments, the data writing sub-circuit is further configured to transmit a data holding signal received at the data signal terminal to the second node in response to a third operating voltage of the second scanning signal received at the second scanning signal terminal.

In some embodiments, the reset sub-circuit is further coupled to a second initialization signal terminal, a third scanning signal terminal and a fifth node connected to an anode of a light-emitting device; the reset sub-circuit is further configured to transmit a second initialization signal received at the second initialization signal terminal to the fifth node under control of an operating voltage of a third scanning signal received at the third scanning signal terminal.

In some embodiments, a start time of the operating voltage of the reset signal is prior to a start time of an operating voltage of the first scanning signal, and a time interval between the start time of the operating voltage of the reset signal and the start time of the operating voltage of the first scanning signal is greater than or equal to 3 row scanning periods; and/or an end time of the operating voltage of the reset signal is after the start time of the operating voltage of the first scanning signal, and a time interval between the end time of the operating voltage of the reset signal and the start time of the operating voltage of the first scanning signal is greater than or equal to 2 row scanning periods.

In another aspect, a driving method of a pixel circuit is provided. The driving method of the pixel circuit is used to drive the pixel circuit according to any one of the above embodiments. A display frame includes a refresh frame, and the refresh frame includes a first reset phase and a second reset phase.

In the first reset phase, the reset sub-circuit transmitting the first initialization signal received at the first initialization signal terminal to the first node in response to the operating voltage of the reset signal of the reset signal terminal, and the storage sub-circuit storing a voltage of the second node after a previous frame ends. In the second reset phase, the reset sub-circuit transmitting the first initialization signal received at the first initialization signal terminal to the first node in response to the operating voltage of the reset signal of the reset signal terminal, the compensation sub-circuit transmitting a voltage of the first node to the third node in response to an operating voltage of the first scanning signal received at the first scanning signal terminal, and the driving sub-circuit transmitting a voltage of the third node to the second node under control of the voltage of the first node.

In some embodiments, the pixel circuit further includes a data writing sub-circuit coupled to a data signal terminal, a second scanning signal terminal and the second node, and the refresh frame further includes a first data writing phase and a second data writing phase.

In the first data writing phase, the data writing sub-circuit transmitting a data signal received at the data signal terminal to the second node in response to a first operating voltage of a second scanning signal received at the second scanning signal terminal, the driving sub-circuit transmitting a voltage of the second node to the third node under the control of the voltage of the first node, and the compensation sub-circuit transmitting a voltage of the third node to the first node in response to the operating voltage of the first scanning signal received at the first scanning signal terminal.

In the second data writing phase, the storage sub-circuit performing a discharge to transmit a stored data signal to the second node, the driving sub-circuit transmitting a voltage of the second node to the third node under the control of a voltage of the first node, and the compensation sub-circuit transmitting a voltage of the third node to the first node in response to the operating voltage of the first scanning signal received at the first scanning signal terminal.

In some embodiments, transistors included in the compensation sub-circuit are P-type transistors; the second reset phase includes at least 3 row scanning periods. In the second reset phase, an operating voltage of the first scanning signal in a first row scanning period is greater than an operating voltage of the first scanning signal in a second row scanning period. The first data writing phase is after the second reset phase and coincides with a 2N-th row scanning period after a start time of the second reset phase, where N≥2 and N is an integer.

In some embodiments, the refresh frame further includes a third reset phase and a light-emitting phase, and the third reset phase is between the second data writing phase and the first light-emitting phase. In the third reset phase, the data writing sub-circuit transmitting a data refresh signal received at the data signal terminal to the second node in response to a second operating voltage of the second scanning signal received at the second scanning signal terminal.

In some embodiments, a time interval between a start time of the third reset phase and an end time of the second data writing phase is greater than or equal to one row scanning period, and/or a time interval between an end time of the third reset phase and a start time of the first light-emitting phase is greater than or equal to one row scanning period.

In some embodiments, a time interval between a start time point of the first reset phase and a start time point of a frame in which the first reset phase is located is greater than or equal to two row scanning periods.

In some embodiments, the pixel circuit further includes a data writing sub-circuit, a leakage prevention sub-circuit and a light-emitting control sub-circuit. The pixel circuit is driven at a first refresh rate and a second refresh rate, and the second refresh rate is less than the first refresh rate; at the first refresh rate, the display frame includes the refresh frame; at the second refresh rate, the display frame includes the refresh frame and at least one holding frame; a holding frame includes a black frame insertion phase, a fourth reset phase and a second light-emitting phase.

In the black frame insertion phase, the light-emitting control sub-circuit controlling a circuit branch transmitting a driving current signal to be opened in response to a non-operating voltage of an enable signal received at an enable signal terminal.

In the fourth reset phase, the data writing sub-circuit transmitting a data holding signal received at a data signal terminal to the second node in response to a third operating voltage of a second scanning signal received at a second scanning signal terminal.

In the second light-emitting phase, the light-emitting control sub-circuit transmitting a first voltage signal received at the first voltage signal terminal to the second node in response to an operating voltage of the enable signal received at the enable signal terminal, the driving sub-circuit generating a driving current signal based on a voltage of the first node and a voltage of the second node, the light-emitting control sub-circuit transmitting the driving current signal to a light-emitting device in response to the operating voltage of the enable signal received at the enable signal terminal; and the leakage prevention sub-circuit transmitting a constant voltage signal received at a constant voltage terminal to a fourth node in response to an operating voltage of a control signal received at a control signal terminal.

In some embodiments, a time interval between an end time of the fourth reset phase and a start time of the second light-emitting phase is greater than or equal to one row scanning period.

In yet another aspect, a display panel is provided. The display device includes a plurality of pixel circuits each according to any one of the above embodiments. The plurality of pixel circuits are arranged in M rows and N columns, each row includes N pixel circuits arranged in a first direction, and each column includes M pixel circuits arranged in a second direction substantially perpendicular to the first direction; M>1, N>1, and M and N are both integers.

In some embodiments, in the second direction, from a first row of pixel circuits to a last row of pixel circuits, the M rows of pixel circuits are respectively a 1 st row of pixel circuits to an M-th row of pixel circuits.

The display panel further includes a first gate driving circuit, the first gate driving circuit includes M+Q first shift registers that are cascaded, and from a first shift register at a first stage to a shift register at a last stage, the M+Q first shift registers are respectively a 1st first shift register to an (M+Q)-th first shift register; each first shift register includes a first signal output terminal. First scanning signal terminals of a P-th row of pixel circuits are connected to a first signal output terminal of a (P+Q)-th first shift register; reset signal terminals of the P-th row of pixel circuits are connected to a first signal output terminal of a P-th first shift register; P≤M, Q>0, and P and Q are both integers.

In some embodiments, in the second direction, from a first row of pixel circuits to a last row of pixel circuits, the M rows of pixel circuits are respectively a 1 st row of pixel circuits to an M-th row of pixel circuits.

The display panel further includes a second gate driving circuit and a third driving circuit. The second gate driving circuit includes M second shift registers that are cascaded; from a second shift register at a first stage to a second shift registers at a last stage, the M second shift registers are respectively a 1 st second shift register to an M-th second shift register; each second shift register includes a second signal output terminal; first scanning signal terminals of a P-th row of pixel circuits are connected to a second signal output terminal of a P-th second shift register; P≤M, and P is an integer.

The third gate driving circuit includes M third shift registers that are cascaded; from a third shift register at a first stage to a third shift register at a last stage, the M third shift registers are respectively a 1 st third shift register to an M-th third shift register; each third shift register includes a third signal output terminal; reset signal terminals of the P-th row of pixel circuits are connected to a third signal output terminal of a P-th third shift register; P≤M, and P is an integer.

In still yet another aspect, a display device is provided. The display device includes the display panel according to any one of the above embodiments.

BRIEF DESCRIPTION OF THE DRAWINGS

In order to describe the technical solutions in the present disclosure more clearly, accompanying drawings to be used in some embodiments of the present disclosure will be briefly introduced below. Obviously, the accompanying drawings to be described below are merely drawings of some embodiments of the present disclosure, and a person of ordinary skill in the art can obtain other drawings according to those drawings. In addition, the accompanying drawings in the following description may be regarded as schematic diagrams, but are not limitations on actual sizes of products, actual processes of methods and actual timings of signals involved in the embodiments of the present disclosure.

DESCRIPTION OF THE INVENTION

Figure 1:
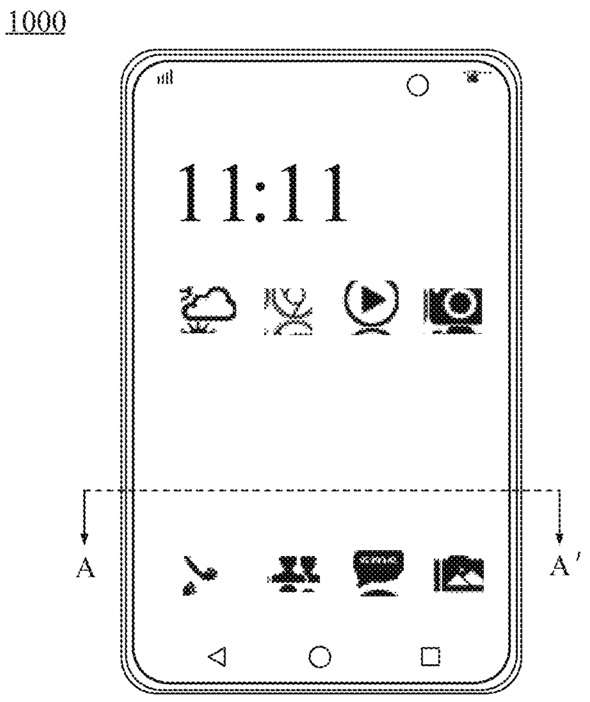
FIG. 1 is a structural diagram of a display device, in accordance with some embodiments.

The technical solutions in some embodiments of the present disclosure will be clearly and completely described below with reference to the accompanying drawings. Obviously, the embodiments to be described are merely some but not all embodiments of the present disclosure. All other embodiments obtained by a person of ordinary skill in the art based on the embodiments of the present disclosure should belong to the protection scope of the present disclosure.

Unless the context requires otherwise, throughout the description and claims, the term "comprise" and other forms thereof such as the third-person singular form "comprises" and the present participle form "comprising" are construed as an open and inclusive meaning, i.e., "including, but not limited to". In the description of the specification, terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a/the plurality of" means two or more unless otherwise specified.

In the description of some embodiments, terms such as "coupled" and "connected" and derivatives thereof may be used. The term "connected" should be understood in a broad sense; for example, the term "connected" may represent a fixed connection, or a detachable connection, or a one-piece connection; alternatively, the term "connected" may represent a direct connection, or an indirect connection through an intermediate medium. The term "coupled" indicates that two or more components are in direct physical or electrical contact. The term "coupled" or "communicatively coupled" may indicate that two or more components are not in direct contact with each other but still cooperate or interact with each other. The embodiments disclosed herein are not necessarily limited to the content herein.

The phrase "at least one of A, B, and C" has the same meaning as the phrase "at least one of A, B, or C", both including the following combinations of A, B, and C: only A, only B, only C, a combination of A and B, a combination of A and C, a combination of B and C, and a combination of A, B, and C.

The phrase "A and/or B" includes following three combinations: only A, only B, and a combination of A and B.

As used herein, the term "if", depending on the context, is optionally construed as "when", or "in a case where", or "in response to determining that", or "in response to detecting". Similarly, depending on the context, the phrase "if it is determined that" or "if [a stated condition or event] is detected" is optionally construed as "in a case where it is determined that", or "in response to determining that", or "in a case where [the stated condition or event] is detected", or "in response to detecting [the stated condition or event]".

The phrase "applicable to" or "configured to" used herein represents an open and inclusive expression, which does not exclude devices that are applicable to or configured to perform additional tasks or steps.

In addition, the use of the phrase "based on" or "according to" is meant to be open and inclusive, since a process, step, calculation or other action that is "based on" or "according to" one or more of the stated conditions or values may, in practice, be based on or according to additional conditions or values exceeding those stated.

Considering measurement in question and errors (i.e., limitations of a measurement system) associated with measurement of a particular quantity, the term such as "about", "approximately", or "substantially" as used herein includes a stated value within an acceptable range of deviation of a particular value as determined by a person of ordinary skill in the art. For example, the term "about" may indicate that the stated value is within one or more standard deviations, or within ±30%, 20%, 10%, or ±5% of the stated value.

The term such as "parallel", "perpendicular", or "equal" as used herein includes a stated condition and a condition similar to the stated condition within an acceptable range of deviation; the acceptable range of deviation may be determined, for example, by a person of ordinary skill in the art, considering measurement in question and errors (i.e., limitations of a measurement system) associated with measurement of a particular quantity. For example, the term "parallel" includes absolute parallelism and approximate parallelism, and an acceptable range of deviation of the approximate parallelism may be, for example, a deviation within 5°; the term "perpendicular" includes absolute perpendicularity and approximate perpendicularity, and an acceptable range of deviation of the approximate perpendicularity may also be, for example, a deviation within 5°; and the term "equal" includes absolute equality and approximate equality, and an acceptable range of deviation of the approximate equality may be, for example, that a difference between two equals is less than or equal to 5% of either of the two equals.

It will be understood that, in a case where a layer or element is referred to as being on another layer or substrate, it may be that the layer or element is directly on the another layer or substrate, or it may be that intermediate layer(s) exist between the layer or element and the another layer or substrate.

Exemplary embodiments are described herein with reference to sectional views and/or plan views as idealized exemplary drawings. In the accompanying drawings, thicknesses of layers and sizes of regions are enlarged for clarity. Thus, variations in shape with respect to the accompanying drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown to have a rectangular shape generally has a feature of being curved. Therefore, the regions shown in the accompanying drawings are schematic in nature, and their shapes are not intended to show actual shapes of the regions in a device, and are not intended to limit the scope of the exemplary embodiments.

It will be noted that, unless otherwise defined, all terms (including technical and scientific terms) used in the specification have the same meanings as commonly understood by a person of ordinary skill in the art of the present disclosure. It will be further understood that, unless expressly defined herein, terms (such as those defined in commonly used dictionaries) should be construed as having meanings that are consistent with their meanings in the context of related art, and should not be construed as having ideal or overly formal meanings.

In the present disclosure, terms such as "lower", "below", "above", and "upper", and the like are used to explain the relationships of components shown in the accompanying drawings. These terms may represent relative concepts and describe the content of specification based on the directions shown in the accompanying drawings, or may describe the content of specification based on the order in which the process steps are performed, but are not limited thereto.

The phrase "opposite to" means that a first element may be directly or indirectly opposite to a second element. In a case where a third element is interposed between the first element and the second element, the first element and the second element may be understood as being indirectly opposite to each other although still opposite to each other.

The transistors used in the embodiments of the present disclosure may be thin film transistors (TFTs), metal oxide semiconductor (MOS) field effect transistors or other switching devices with same characteristics, and the embodiments of the present disclosure will all be described by taking an example in which the transistors are thin film transistors.

For each thin film transistor used in the embodiments of the present disclosure, a control electrode is a gate of the transistor, a first electrode is one of a source and a drain of the thin film transistor, and the second electrode is the other of the source and the drain of the thin film transistor. Since the source and the drain of the thin film transistor may be symmetrical in structure, there may be no difference in structure between the source and the drain; that is, in the embodiments of the present disclosure, there may be no difference in structure between the first electrode and the second electrode of the thin film transistor. For example, in a case where the transistor is a P-type transistor, the first electrode of the transistor is the source, and the second electrode of the transistor is the drain; for another example, in a case where the transistor is an N-type transistor, the first electrode of the transistor is the drain, and the second electrode of the transistor is the source.

In the embodiments of the present disclosure, a capacitor may be fabricated by a process separately; for example, the capacitor may be realized by fabricating specialized capacitor plates, and each capacitor plate of the capacitor may be realized by a metal layer or a semiconductor layer (e.g., doped polycrystalline silicon). The capacitor may be a parasitic capacitance between transistors, or may be realized by a transistor itself and other devices or wirings, or may be realized by a parasitic capacitance between wirings of a circuit itself.

In the embodiments of the present disclosure, nodes such as a first node, a second node, a first control node and a second control node do not represent actual components, but represent junctions of related electrical connections in a circuit diagram; that is, these nodes are points equivalent to junctions of the related electrical connections in the circuit diagram.

In the embodiments of the present disclosure, the term "operating voltage" refers to a voltage that can cause a transistor operated by the voltage to be turned on; and correspondingly, the term "non-operating voltage" refers to a voltage a voltage that cannot cause a transistor operated by the voltage to be turned on.

In the embodiments of the present disclosure, the term "low level" refers to a voltage that can cause a P-type transistor operated by the voltage to be turned on and cannot cause an N-type transistor operated by the voltage to be turned on (i.e., the N-type transistor is turned off); and correspondingly, the term "high level" refers to a voltage that can cause an N-type transistor operated by the voltage to be turned on and cannot cause a P-type transistor operated by the voltage to be turned on (i.e., the P-type transistor is turned off).

Figure 2:
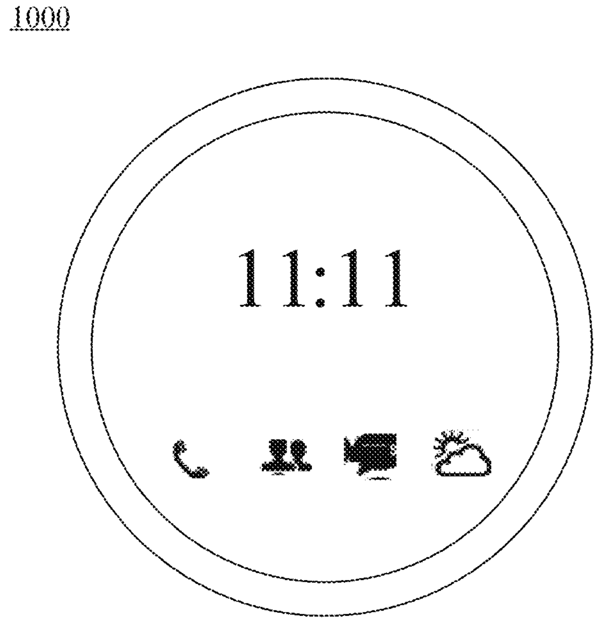
FIG. 2 is a structural diagram of another display device, in accordance with some embodiments.

As shown in FIGS. 1 and 2, some embodiments of the present disclosure provide a display device 1000, and the display device 1000 may be any device that displays images whether in motion (e.g., a video) or stationary (e.g., static images), and whether textual or graphical.

For example, the display device 1000 may be any product or component having a display function, such as a television, a notebook computer, a tablet computer, a mobile phone, a personal digital assistant (PDA), a navigator, a wearable device, a virtual reality (VR) device.

For example, as shown in FIG. 1, the display device 1000 may be a portable display device, such as the mobile phone shown in FIG. 1. For another example, referring to FIG. 2, the display device 1000 may be a wearable device, such as the watch shown in FIG. 2.

Some embodiments of the present disclosure will be schematically described below by taking an example in which the display device 1000 is the mobile phone shown in FIG. 1, but the embodiments of the present disclosure are not limited thereto.

Figure 3:
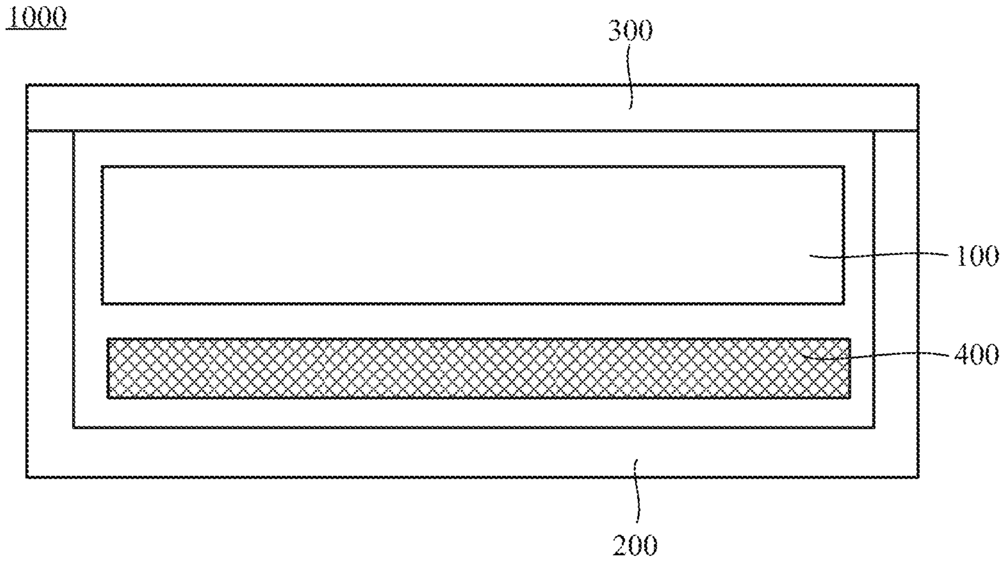
FIG. 3 is a sectional view taken along the section line A-A' in FIG. 1.

In some embodiments, referring to FIG. 3, the display device 1000 includes a display panel 100.

The display panel 100 includes a light exit surface and a non-light exit surface that are oppositely arranged. The light exit surface refers to a surface of the display panel 100 for displaying images, i.e., the upper surface in FIG. 3.

For example, as shown in FIG. 3, the display device 1000 may further include a housing 200, a cover plate 300, a circuit board 400 and other electronic components.

Referring to FIG. 3, the cover plate 300 may be a single-layer glass cover plate, or may include multiple layers of cover sub-plates that are stacked, which is not specifically limited in the embodiments of the present disclosure.

As shown in FIG. 3, a longitudinal section of the housing 200 may be in a U-shape, the display panel 100 and the circuit board 400 are disposed in the housing 200, and the cover plate 300 is disposed at an opening of the housing 200. The circuit board 400 is disposed on a side of the display panel 100 away from the cover plate 300, and the circuit board 400 is connected to the display panel 100 to provide the display panel 100 with a required display signal.

There are various types of display panels 100, which may be selected according to actual needs.

For example, the display panel 100 may be an organic light-emitting diode (OLED) display panel or a quantum dot light-emitting diode (QLED) display panel, which is not specifically limited in the embodiments of the present disclosure.

Some embodiments of the present disclosure will be schematically described below by taking an example in which the display panel 100 is an OLED display panel.

Figure 5:
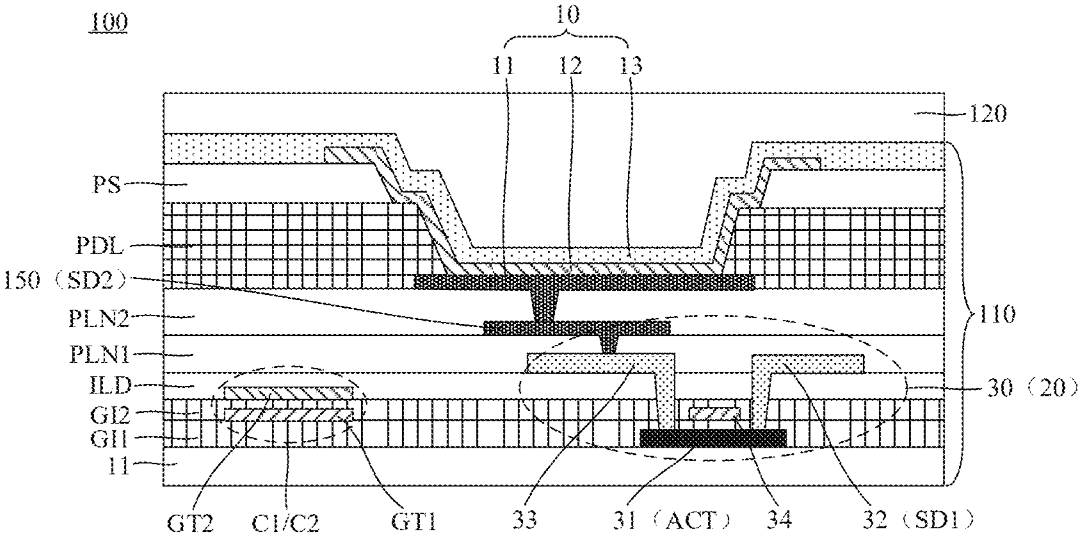
FIG. 5 is a sectional view taken along the section line C-C' in FIG. 4.

In some embodiments, referring to FIG. 5, the display panel 100 includes a display substrate 110 and an encapsulation layer 120 for encapsulating the display substrate 110.

The encapsulation layer 120 may be an encapsulation film or an encapsulation substrate, which is not specifically limited in the embodiments of the present disclosure.

Figure 4:
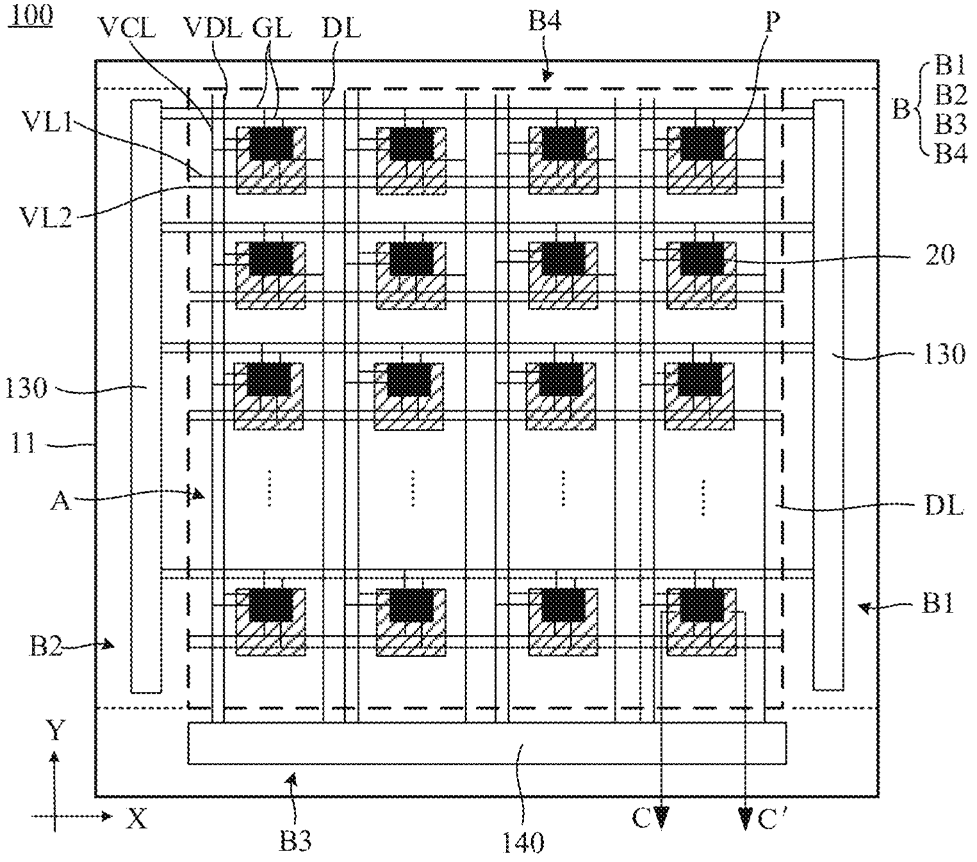
FIG. 4 is a structural diagram of a display panel, in accordance with some embodiments.

In some embodiments, referring to FIG. 4, the display panel 100 has a display region A. The display region A is a region where an image is displayed, and the display region A is configured to be provided with a plurality of sub-pixels P therein.

For example, referring to FIG. 4, the display panel 100 includes a substrate 11 and the plurality of sub-pixels P disposed on a side of the substrate 11 and located in the display region A.

There are various types of substrates 11, which may be selected according to actual needs.

For example, the substrate 11 may be a rigid substrate. For instance, the rigid substrate may be a glass substrate or a polymethyl methacrylate (PMMA) substrate.

For another example, the substrate 11 may be a flexible substrate. For instance, the flexible substrate may be a polyethylene terephthalate (PET) substrate, a polyethylene naphthalate two formic acid glycol ester (PEN) substrate, or a polyimide (PI) substrate.

Referring to FIGS. 4 and 5, each sub-pixel P includes a light-emitting device 10 and a pixel circuit 20. The pixel circuit 20 includes a plurality of thin film transistors 30.

As shown in FIG. 5, the thin film transistor 30 includes a semiconductor channel 31, a source 32, a drain 33 and a gate 34; the source 32 and the drain 33 are both in contact with the semiconductor channel 31.

As shown in FIG. 5, the light-emitting device 10 includes a first electrode 11, a light-emitting functional layer 12 and a second electrode 13; the first electrode 11 is electrically connected to a source 32 or a drain 33 of a thin film transistor 30. FIG. 5 is illustrated with an example in which the first electrode 11 is electrically connected to the drain 33 of the thin film transistor 30.

It will be noted that, the light-emitting functional layer 12 may only include a light-emitting layer, or may include the light-emitting layer and at least one of an electron transporting layer (ETL), an electron injection layer (EIL), a hole transporting layer (HTL), and a hole injection layer (HIL).

At present, a display device adopts a display panel with a variable refresh rate to meet users' demands for low power consumption and high refresh rate. However, in a case where images are displayed at a low frequency, the frame rate of the display panel is reduced, so that flicker of the display panel is more sensible to human eyes, resulting in that human eyes may perceive the flicker of the display screen.

It has been found through researches that a channel of a driving transistor in a pixel circuit exhibits a significant hysteresis effect due to a large number of defect states of itself, resulting in that an image of a previous moment (a previous frame period) often remains in an image displayed at a next moment, which causes the flicker problem of the display screen.

It will be noted that, the hysteresis effect refers to an uncertainty in the electrical characteristics of the driving transistor under a certain bias voltage; that is, the magnitude of current of the driving transistor is not only related to the current bias voltage, but also related to the bias state in the previous period.

Figure 6:
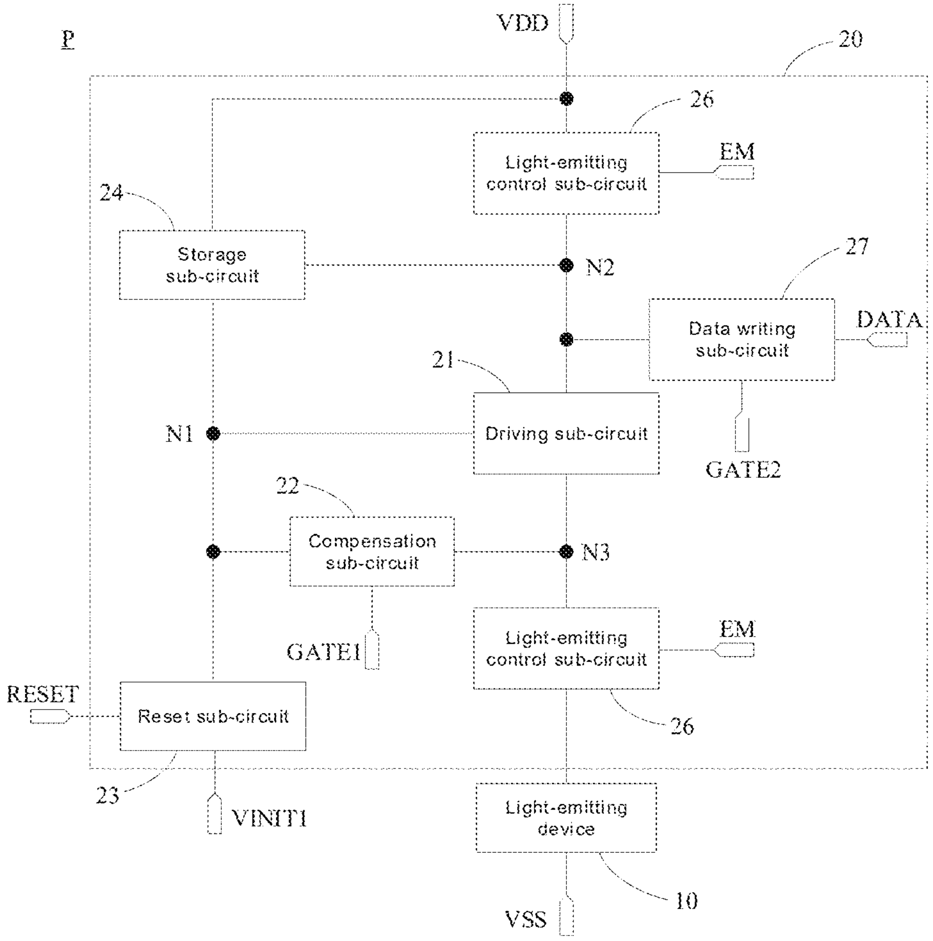
FIG. 6 is a block diagram showing a structure of a pixel circuit, in accordance with some embodiments.

Based on this, referring to FIG. 6, a pixel circuit 20 provided by some embodiments of the present disclosure includes a driving sub-circuit 21, a compensation sub-circuit 22, a reset sub-circuit 23 and a storage sub-circuit 24.

In some examples, as shown in FIG. 6, the driving sub-circuit 21 is coupled to a first node N1, a second node N2 and a third node N3. The driving sub-circuit 21 is configured to control a circuit branch between the second node N2 and the third node N3 to be closed and opened under control of a voltage of the first node N1 and generate a driving current signal based on the voltage of the first node N1 and a voltage of the second node N2.

Figure 7:
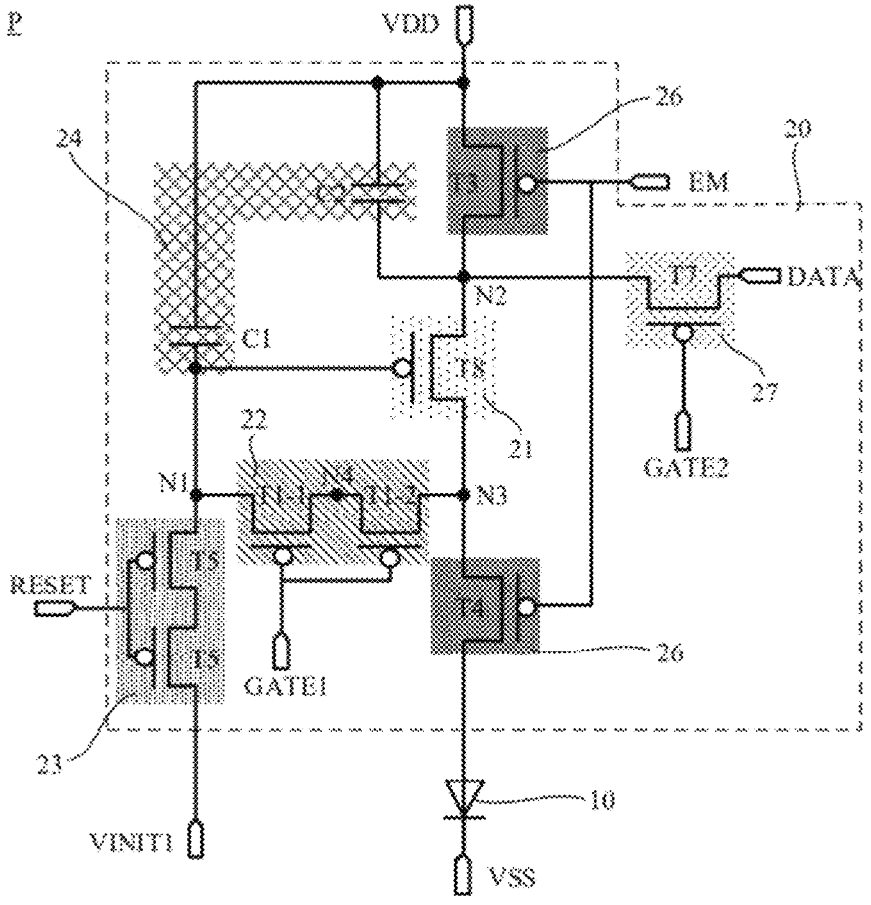
FIG. 7 is a circuit diagram of the pixel circuit shown in FIG. 6.

For example, as shown in FIG. 7, the driving sub-circuit 21 includes an eighth transistor T8 (i.e., the driving transistor mentioned above); a first electrode of the eighth transistor T8 is connected to the second node N2, a second electrode of the eighth transistor T8 is connected to the third node N3, and a control electrode of the eighth transistor T8 is connected to the first node N1.

In some examples, as shown in FIG. 6, the compensation sub-circuit 22 is coupled to a first scanning signal terminal GATE1, the first node N1, and the third node N3. The compensation sub-circuit 22 is configured to control a circuit branch between the first node N1 and the third node N3 to be closed and opened in response to a first scanning signal received at the first scanning signal terminal GATE1.

For example, referring to FIG. 7, the compensation sub-circuit 22 includes a first sub-transistor T1-1 and a second sub-transistor T1-2 that are connected in series; a first electrode of the first sub-transistor T1-1 is connected to the first node N1, a second electrode of the first sub-transistor T1-1 and/or a first electrode of the second sub-transistor T1-2 is connected to a fourth node N4, a second electrode of the second sub-transistor is connected to the third node N3, and control electrodes of the first sub-transistor T1-1 and the second sub-transistor T1-2 are connected to the first scanning signal terminal GATE1.

It will be noted that, there may exist other transistors connected in series between the first sub-transistor T1-1 and the second sub-transistor T1-2; that is, the compensation sub-circuit 22 may include three, four or more transistors connected in series, which is not specifically limited in the embodiments of the present disclosure.

Some embodiments of the present disclosure will be schematically described below by taking an example in which the compensation sub-circuit 22 includes the first sub-transistor T1-1 and the second sub-transistor T1-2 connected in series, but the embodiments of the present disclosure are not limited to thereto; it may also be considered that the compensation sub-circuit 22 includes three, four or more transistors connected in series as long as the same technical concept is applied.

In some examples, as shown in FIG. 6, the reset sub-circuit 23 is coupled to a first initialization signal terminal VINIT1, a reset signal terminal RESET, and the first node N1. The reset sub-circuit 23 is configured to transmit a first initialization signal received at the first initialization signal terminal VINIT1 to the first node N1 in response to an operating voltage of a reset signal received at the reset signal terminal RESET to reset the voltage of the first node N1.

For example, referring to FIG. 7, the reset sub-circuit 23 includes a plurality of fifth transistors T5 connected in series; an electrode of the plurality of fifth transistors T5 is connected to the first initialization signal terminal VINIT1, another electrode of the plurality of fifth transistors T5 is connected to the first node N1, and a control electrode of each fifth transistor T5 is connected to the reset signal terminal RESET.

For example, as shown in FIG. 7, the reset sub-circuit 23 includes two fifth transistors T5 connected in series, and the two fifth transistors T5 constitute a double-gate transistor to reduce leakage current.

Figure 13:
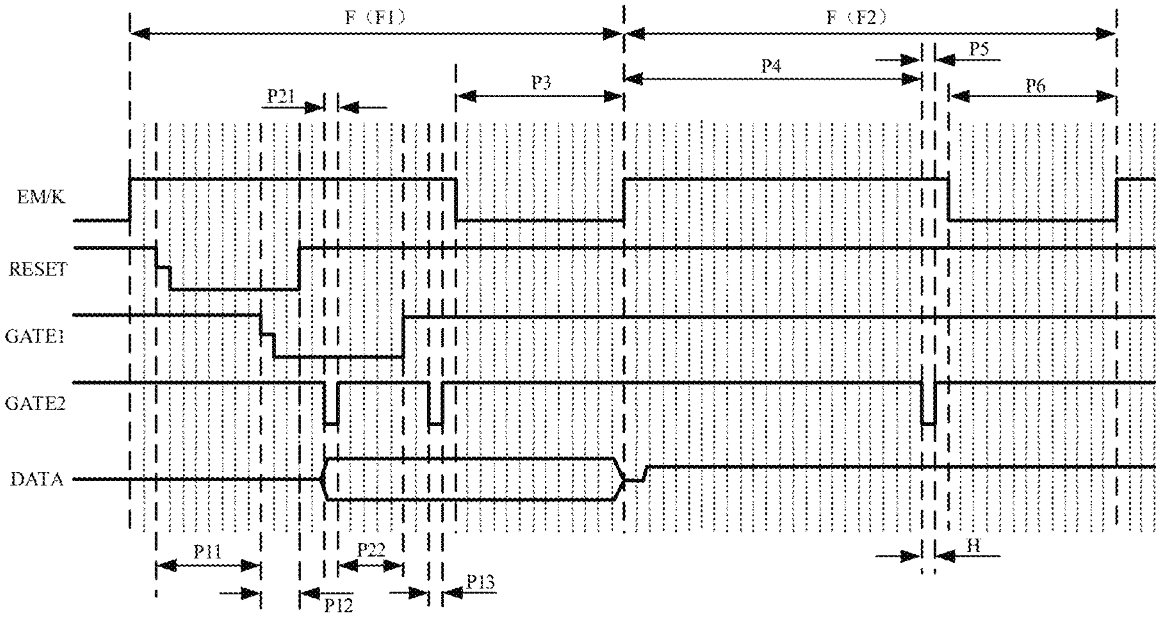
FIG. 13 is a timing diagram of a pixel circuit, in accordance with some embodiments.
Figure 14:
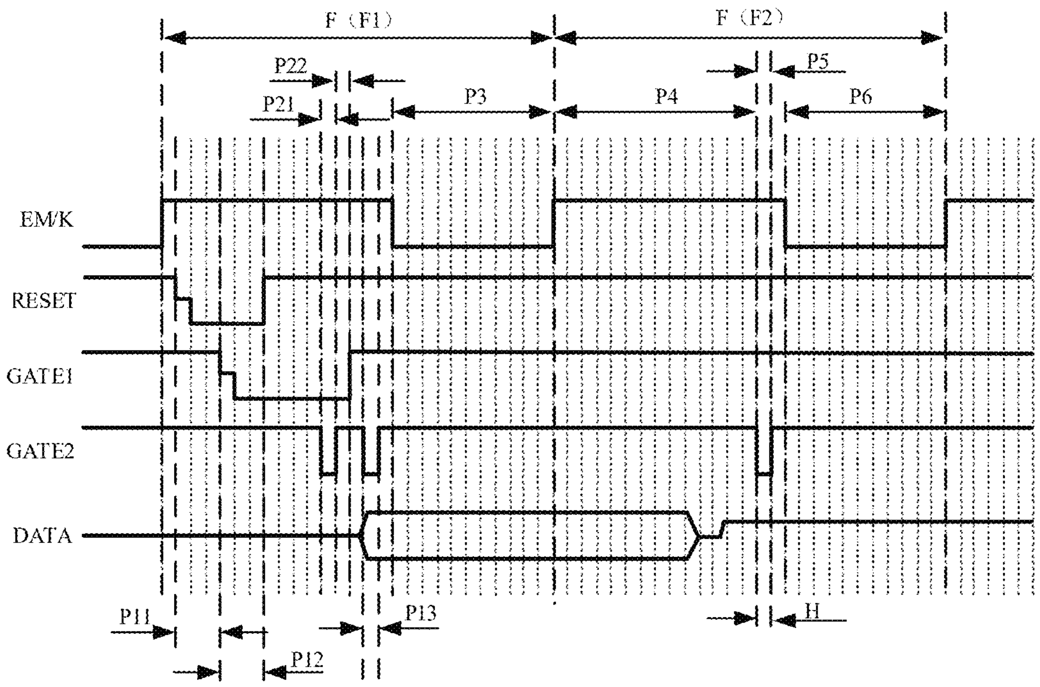
FIG. 14 is another timing diagram of a pixel circuit, in accordance with some embodiments.
Figure 15:
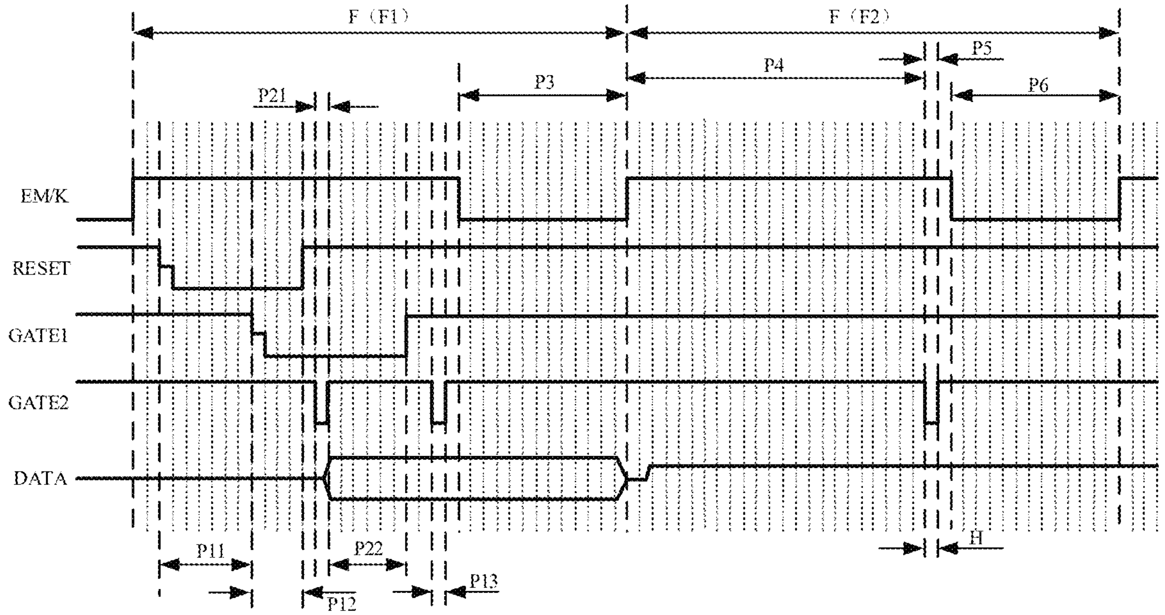
FIG. 15 is still another timing diagram of a pixel circuit, in accordance with some embodiments.

Referring to FIGS. 13, 14 and 15, a start time of the operating voltage of the reset signal is prior to a start time of an operating voltage of the first scanning signal; and a time interval between the start time of the operating voltage of the reset signal and the start time of the operating voltage of the first scanning signal is greater than or equal to 3 row scanning periods. FIG. 13 is illustrated by taking an example in which the time interval between the start time of the operating voltage of the reset signal and the start time of the operating voltage of the first scanning signal is 8 row scanning periods.

In addition, referring to FIGS. 13, 14 and 15, an end time of the operating voltage of the reset signal is after the start time of the operating voltage of the first scanning signal. Furthermore, a time interval between the end time of the operating voltage of the reset signal and the start time of the operating voltage of the first scanning signal is greater than or equal to 2 row scanning periods. FIG. 13 is illustrated by taking an example in which the time interval between the end time of the operating voltage of the reset signal and the start time of the operating voltage of the first scanning signal is 3 row scanning periods.

In some examples, as shown in FIG. 6, the storage sub-circuit 24 is coupled to a first voltage signal terminal VDD, the first node N1 and the second node N2. The storage sub-circuit 24 is configured to store the voltages of the first node N1 and the second node N2.

For example, as shown in FIG. 7, the storage sub-circuit 24 includes a first storage capacitor C1 and a second storage capacitor C2; a first plate of the first storage capacitor C1 is connected to the first voltage signal terminal VDD, and a second plate of the first storage capacitor C1 is connected to the first node N1; a first plate of the second storage capacitor C2 is connected to the first voltage signal terminal VDD, and a second plate of the second storage capacitor C2 is connected to the second node N2.

In this case, after the start of a frame display, the storage sub-circuit 24 may store a voltage of the second node N2 after the end of a previous frame display, so that the second node N2 maintains a relatively stable potential corresponding to a first voltage signal. In this way, a stable and great bias voltage is generated between the first node N1 and the second node N2 connected to the driving sub-circuit 21 to ameliorate the hysteresis characteristic of the driving sub-circuit 21, thereby alleviating the residual image phenomenon of the sub-pixels P, reducing the flicker value of the display panel 100, so as to alleviate the problem that human eyes can perceive the flicker of the display screen.

That is, after the start of a frame display, the second storage capacitor C2 may store the voltage of the second node N2 (i.e., the first electrode of the eighth transistor T8) after the end of the previous frame display, so that the second node N2 maintains a relatively stable potential corresponding to the first voltage signal. In this way, a stable and great bias voltage is generated between the first electrode (the second node N2) and the control electrode (the first node N1) of the eighth transistor T8 to ameliorate the hysteresis characteristic of the eighth transistor T8, thereby alleviating the residual image phenomenon of the sub-pixels P, reducing the flicker value of the display panel 100, so as to alleviate the problem that human eyes can perceive the flicker of the display screen.

Figure 8A:
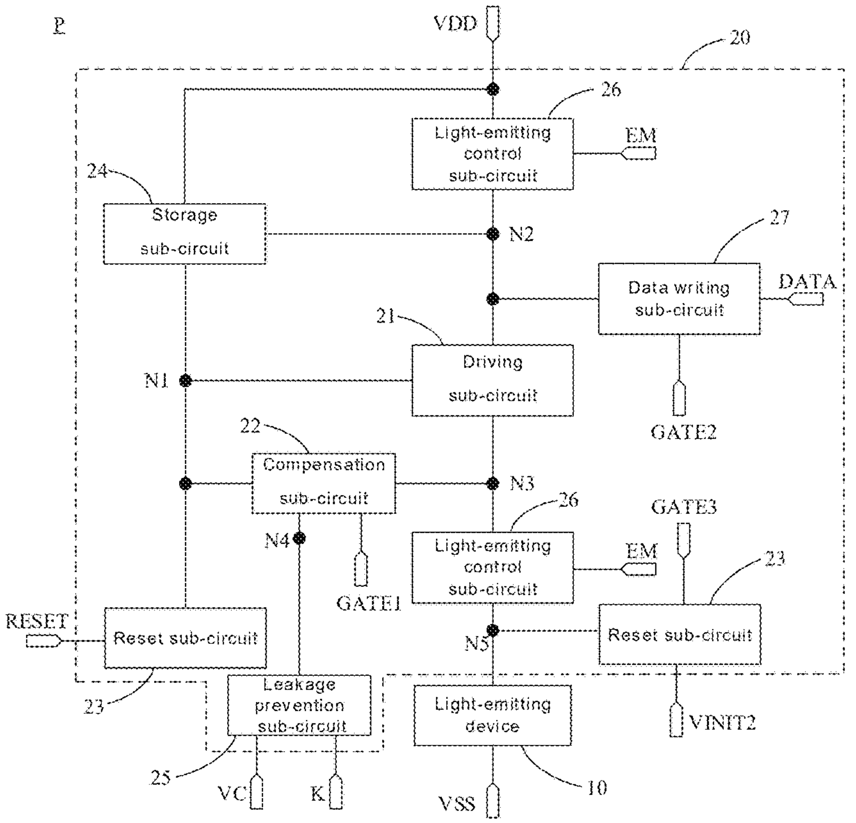
FIG. 8A is a block diagram showing a structure of another pixel circuit, in accordance with some embodiments.

In some embodiments, as shown in FIG. 8A, the pixel circuit 20 further includes a leakage prevention sub-circuit 25.

Figure 9A:
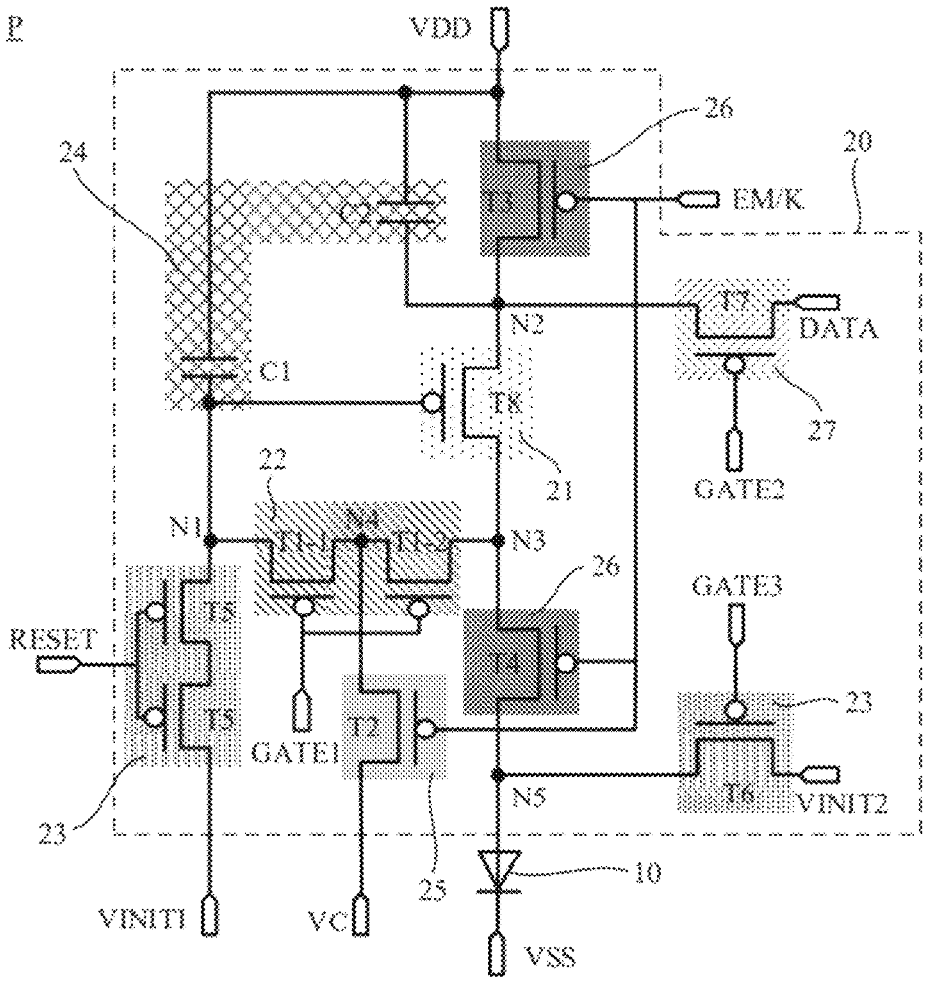
FIG. 9A is a circuit diagram of the pixel circuit shown in FIG. 8A.
Figure 9B:
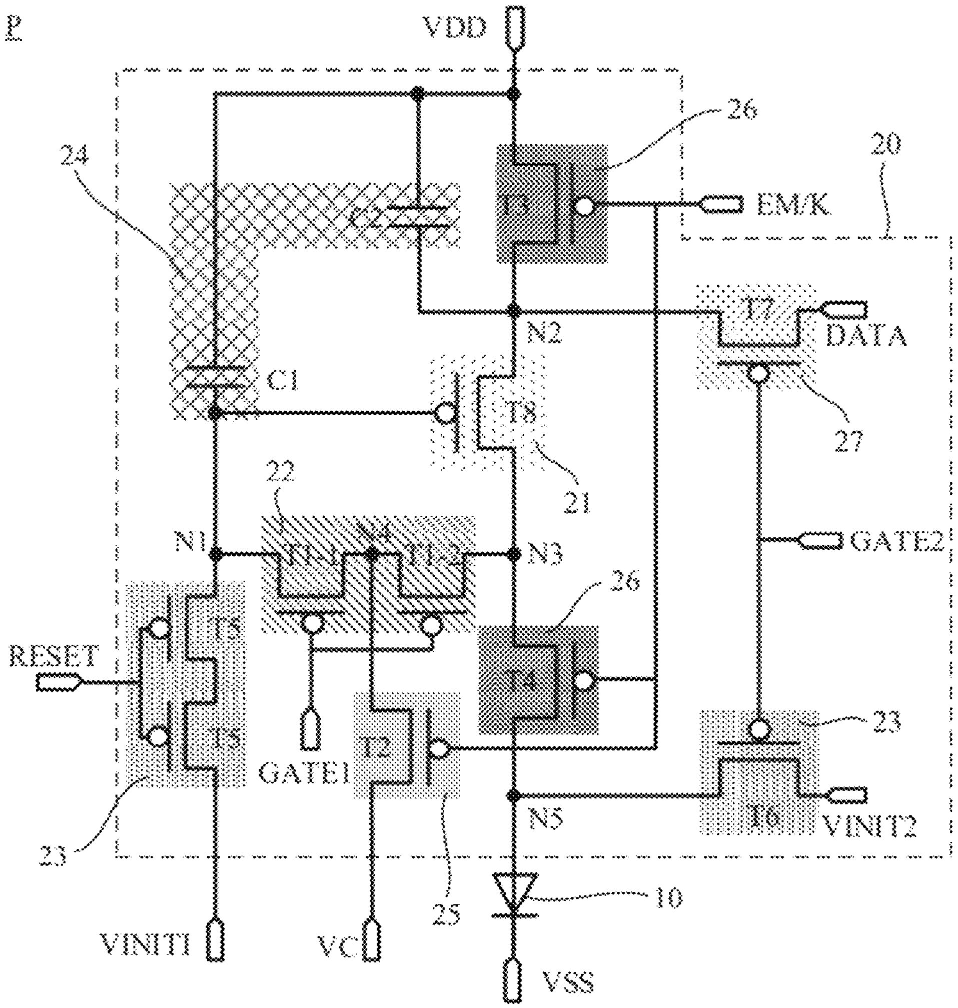
FIG. 9B is a circuit diagram of the pixel circuit shown in FIG. 8B.

In some examples, as shown in FIGS. 8A and 9B, the leakage prevention sub-circuit 25 is coupled to a control signal terminal K, a constant voltage terminal VC and the fourth node N4. The leakage prevention sub-circuit 25 is configured to transmit a constant voltage signal received at the constant voltage terminal VC to the fourth node N4 in response to an operating voltage of a control signal received at the control signal terminal K.

The voltage of the constant voltage signal is in a range of −7 V to 7 V. For example, the voltage of the constant voltage signal is any one of −7 V, −6 V, −5 V, −4 V, −3 V, −2 V, −1 V, 0 V, 1 V, 2 V, 3 V, 4 V, 5 V, 6 V and 7 V, and based on experiments and tests specifically, a voltage value having a good current leakage prevention effect may be obtained to serve as the actual voltage value of the constant voltage signal, which is not specifically limited in the embodiments of the present disclosure.

For example, as shown in FIG. 9B, the leakage prevention sub-circuit 25 includes a second transistor T2; a first electrode of the second transistor T2 is connected to the constant voltage terminal VC, a second electrode of the second transistor T2 is connected to the fourth node N4, and a control electrode of the second transistor T2 is connected to the control signal terminal K.

In this case, in a light-emitting phase, the leakage prevention sub-circuit 25 may transmit the constant voltage signal received at the constant voltage terminal VC to the fourth node N4 in response to the operating voltage of the control signal received at the control signal terminal K, which reduces the voltage difference between the fourth node N4 and the first node N1 to reduce the risk of current leakage of the first node N1, thereby reducing the flicker value of the display panel 100 to alleviate the problem that human eyes can perceive the flicker of the display screen.

In some embodiments, as shown in FIG. 8A, the pixel circuit 20 further includes a light-emitting control sub-circuit 26.

In some examples, as shown in FIG. 8A, the light-emitting control sub-circuit 26 is coupled to the first voltage signal terminal VDD, an enable signal terminal EM, the second node N2, the third node N3 and a fifth node N5. The light-emitting control sub-circuit 26 is configured to, in response to an enable signal received at the enable signal terminal EM, control a circuit branch between the first voltage signal terminal VDD and the second node N2 to be closed and opened and control a circuit branch between the third node N3 and the fifth node N5 to be closed and opened.

Here, the first voltage signal may be a signal of a positive terminal of a direct current power supply; for example, a voltage of the first voltage signal may be 5 V.

It will be noted that, the fifth node N5 is connected to an anode of a light-emitting device 10, so that a driving current signal may be transmitted to the light-emitting device 10.

For example, as shown in FIG. 9B, the light-emitting control sub-circuit 26 includes a third transistor T3 and a fourth transistor T4. A first electrode of the third transistor T3 is connected to the first voltage signal terminal VDD, a second electrode of the third transistor T3 is connected to the second node N2, and a control electrode of the third transistor T3 is connected to the enable signal terminal EM. A first electrode of the fourth transistor T4 is connected to the third node N3, a second electrode of the fourth transistor T4 is connected to the fifth node N5, and a control electrode of the fourth transistor T4 is connected to the enable signal terminal EM.

On this basis, as shown in FIG. 9B, signals received at the enable signal terminal EM and the control signal terminal K are the same. In this case, the enable signal terminal EM and the control signal terminal K may be connected to a same signal line, such as a gate line mentioned below, to simplify the circuit structure. That is, in the light-emitting phase, the leakage prevention sub-circuit 25 transmits the constant voltage signal received at the constant voltage terminal VC to the fourth node N4 in response to the operating voltage of the control signal received at the enable signal terminal EM, which reduces the voltage difference between the fourth node N4 and the first node N1 to reduce the risk of current leakage of the first node N1, thereby reducing the flicker value of the display panel 100 to alleviate the problem that human eyes can perceive the flicker of the display screen.

In some embodiments, as shown in FIG. 8A, the pixel circuit 20 further includes a data writing sub-circuit 27.

In some examples, as shown in FIG. 8A, the data writing sub-circuit 27 is coupled to a data signal terminal DATA, a second scanning signal terminal GATE2 and the second node N2. The data writing sub-circuit 27 is configured to transmit a data signal received at the data signal terminal DATA to the second node N2 in response to a first operating voltage of a second scanning signal received at the second scanning signal terminal GATE2 and transmit a data refresh signal received at the data signal terminal DATA to the second node N2 in response to a second operating voltage of the second scanning signal received at the second scanning signal terminal GATE2. The data refresh signal is a data signal received by a pixel circuit 20 in other rows, such as a data signal received by a pixel circuit 20 in a next adjacent row.

It will be noted that, values of the first operating voltage and the second operating voltage of the second scanning signal may be the same, but the timings of the first operating voltage and the second operating voltage are different.

For example, referring to FIGS. 13, 14 and 15, an end time of the first operating voltage of the second scanning signal is prior to an end time of the operating voltage of the first scanning signal. Furthermore, a time interval between the end time of the first operating voltage of the second scanning signal and the end time of the operating voltage of the first scanning signal is greater than or equal to one row scanning period H.

It will be noted that, a row scanning period H is a duration of an operating voltage of the second scanning signal.

For example, as shown in FIG. 13, the time interval between the end time of the first operating voltage of the second scanning signal and the end time of the operating voltage of the first scanning signal is 5 row scanning periods H.

For example, referring to FIGS. 13, 14 and 15, a start time of the first operating voltage of the second scanning signal is after the end time of the operating voltage of the reset signal. Furthermore, a time interval between the start time of the first operating voltage of the second scanning signal and the end time of the operating voltage of the reset signal is greater than or equal to 1 row scanning period H.

For instance, as shown in FIG. 13, the time interval between the start time of the first operating voltage of the second scanning signal and the end time of the operating voltage of the reset signal is 2 row scanning periods H.

In some embodiments, referring to FIG. 9B, the transistors included in the compensation sub-circuit 22 are P-type transistors. In addition, referring to FIGS. 13, 14 and 15, a duration of the operating voltage of the first scanning signal is greater than or equal to 4 row scanning periods H. An operating voltage of the first scanning signal in a first row scanning period H is greater than an operating voltage of the first scanning signal in a second row scanning period H. The row scanning period H is a duration of an operating voltage of the second scanning signal. That is, a stability of a first scanning signal output in an even-numbered row scanning period H is greater than a stability of a first scanning signal output in an odd-numbered row scanning period H.

In the embodiments of the present disclosure, the first row scanning period H in which the first scanning signal is at the operating voltage may be understood as a first period after an effective level of the first scanning signal begins to be input, i.e., a first row scanning period H after a first falling edge of the first scanning signal at the first scanning signal terminal GATE1 in FIG. 13, or a first row scanning period H counting from left to right in a second reset phase P12 in FIG. 13; alternatively, it may be understood as a first period after a level used to cause the first sub-transistor T1-1 in FIG. 9A to be turned on is input.

In the embodiments of the present disclosure, the second row scanning period H in which the first scanning signal at the operating voltage may be understood as a second period after an effective level of the first scanning signal begins to be input, i.e., a second row scanning period H after a first falling edge of the first scanning signal at the first scanning signal terminal GATE1 in FIG. 13, or a second row scanning period H counting from left to right in the second reset phase P12 in FIG. 13; alternatively, it may be understood as a second period after the level used to cause the first sub-transistor T1-1 in FIG. 9A to be turned on is input.

On this basis, a period in which the second scanning signal is at the first operating voltage coincides with a 2N-th row scanning period H in which the first scanning signal is at the operating voltage, where N≥2, and N is an integer.

For example, as shown in FIG. 13, a duration of the operating voltage of the first scanning signal is 11 row scanning periods H, and the period in which the second scanning signal is at the first operating voltage coincides with a 6th row scanning period H in which the first scanning signal is at the operating voltage; that is, N=3.

In addition, referring to FIGS. 13, 14 and 15, a start time and an end time of the second operating voltage of the second scanning signal are both between the end time of the operating voltage of the first scanning signal and a start time of an operating voltage of the enable signal.

Furthermore, a time interval between the start time of the second operating voltage of the second scanning signal and the end time of the operating voltage of the first scanning signal is greater than or equal to one row scanning period H; a time interval between the end time of the second operating voltage of the second scanning signal and the start time of the operating voltage of the enable signal is greater than or equal to one row scanning period H.

For example, as shown in FIG. 13, the time interval between the start time of the second operating voltage of the second scanning signal and the end time of the operating voltage of the first scanning signal is 2 row scanning periods H, and the time interval between the end time of the second operating voltage of the second scanning signal and the start time of the operating voltage of the enable signal is 1 row scanning period H.

In some embodiments, as shown in the FIG. 9B, the data writing sub-circuit 27 is further configured to transmit a data holding signal received at the data signal terminal DATA to the second node N2 in response to a third operating voltage of the second scanning signal received at the second scanning signal terminal GATE2.

Here, a voltage of the data holding signal is in a range of 0 V to $V_{GMP}$, where $V_{GMP}$ refers to a black-state voltage of the sub-pixel P; the black-state voltage means that in a case where a target grayscale of the sub-pixel P is 0, the black-state voltage is directly used as a driving voltage of the sub-pixel P, so that the corresponding sub-pixel does not emit light.

For example, the voltage of the data holding signal is in a range of 0 V to 7 V; for example, the voltage of the data holding signal is any one of 0 V, 1 V, 2 V, 3 V, 4 V, 5 V, 6 V and 7 V. Here, the voltage value of the data holding signal may be determined based on experiments and tests, and a voltage value having a low flicker value may be used as the actual voltage value of the data holding signal, which is not specifically limited in the embodiments of the present disclosure.

It will be noted that, values of the first operating voltage, the second operating voltage and the third operating voltage of the second scanning signal may be the same, but the timings of the first operating voltage, the second operating voltage and the third operating voltage are different.

In some embodiments, as shown in FIG. 9B, the data writing sub-circuit 27 includes a seventh transistor T7; a first electrode of the seventh transistor T7 is connected to the data signal terminal DATA, a second electrode of the seventh transistor T7 is connected to the second node N2, and a control electrode of the seventh transistor T7 is connected to the second scanning signal terminal GATE2.

In some embodiments, as shown in FIG. 8A, the reset sub-circuit 23 is further coupled to a second initialization signal terminal VINIT2, a third scanning signal terminal GATE3 and the fifth node N5. The reset sub-circuit 23 is further configured to transmit a second initialization signal received at the second initialization signal terminal VINIT2 to the fifth node N5 under control of an operating voltage of a third scanning signal received at the third scanning signal terminal GATE3, so as to reset the anode of the light-emitting device 10, i.e., the fifth node N5.

For example, as shown in FIG. 9A, the reset sub-circuit 23 further includes a sixth transistor T6; a first electrode of the sixth transistor T6 is connected to the second initialization signal terminal VINIT2, a second electrode of the sixth transistor T6 is connected to the fifth node N5, and a control electrode of the sixth transistor T6 is connected to the third scanning signal terminal GATE3.

In this case, the control electrode of the sixth transistor T6 for resetting the anode of the light-emitting device 10 (the fifth node N5) may be controlled by the third scanning signal terminal GATE3, so that the anode of the light-emitting device 10 (the fifth node N5) may be reset to improve the light emission efficiency.

In addition, the third scanning signal terminal GATE3 and the second scanning signal terminal GATE2 may be connected to the same signal line; that is, signals respectively received at the third scanning signal terminal GATE3 and the second scanning signal terminal GATE2 may be the same, and the third scanning signal terminal GATE3 may also be referred to as the second scanning signal terminal GATE2.

Figure 8B:
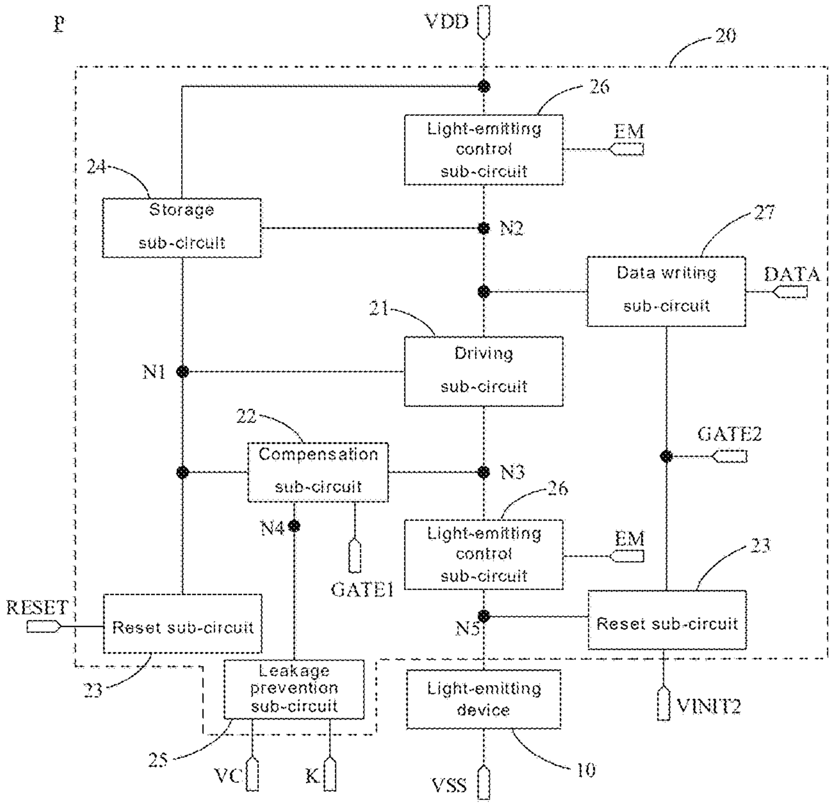
FIG. 8B is a block diagram showing a structure of still another pixel circuit, in accordance with some other embodiments.

In this case, as shown in FIG. 8B, the reset sub-circuit 23 is coupled to the second initialization signal terminal VINIT2, the second scanning signal terminal GATE2 and the fifth node N5. The reset sub-circuit 23 is configured to, under control of the operating voltage of the third scanning signal (the second scanning signal) received at the second scanning signal terminal GATE2, transmit the second initialization signal received at the second initialization signal terminal VINIT2 to the fifth node N5 to reset the anode of the light-emitting device 10 (the fifth node N5).

For example, as shown in FIG. 9B, the reset sub-circuit 23 further includes a sixth transistor T6; a first electrode of the sixth transistor T6 is connected to the second initialization signal terminal VINIT2, a second electrode of the sixth transistor T6 is connected to the fifth node N5, and a control electrode of the sixth transistor T6 is connected to the second scanning signal terminal GATE2.

In this case, the control electrode of the sixth transistor T6 for resetting the anode of the light-emitting device 10 (the fifth node N5) and the control electrode of the seventh transistor T7 may both be controlled by the second scanning signal terminal GATE2, so that the anode of the light-emitting device 10 (the fifth node N5) is reset in the data writing process, and the circuit structure is simplified.

Some embodiments of the present disclosure will be schematically described below by taking an example in which the third scanning signal terminal GATE3 and the second scanning signal terminal GATE2 are connected to the same signal line, but the embodiments of the present disclosure are not limited thereto.

In some embodiments, as shown in FIG. 4, all the pixel circuits 20 are arranged in multiple rows and columns; each row includes multiple pixel circuits 20 arranged in a first direction X, and each column includes multiple pixel circuits 20 arranged in a second direction Y. The first direction X is substantially perpendicular to the second direction Y.

It will be noted that, the first direction X may be a row direction in which the pixel circuits 20 are arranged, and the second direction Y may be a column direction in which the pixel circuits 20 are arranged.

Some embodiments of the present disclosure will be schematically described below by taking an example in which all the pixel circuits 20 are arranged in multiple rows and multiple columns, but the embodiments of the present disclosure are not limited thereto. In addition, multiple pixel circuits 20 arranged in the first direction X is referred to as a row of pixel circuits 20, and multiple pixel circuits 20 arranged in the second direction Y is referred to as a column of pixel circuits 20.

On this basis, the display panel 100 further includes a plurality of gate lines GL, a plurality of data lines DL, a plurality of first power lines VDL, a plurality of first initialization signal lines VL1, a plurality of second initialization signal lines VL2 and a plurality of constant voltage signal lines VCL.

As shown in FIG. 4, each gate line GL extends substantially in the first direction X and is configured to transmit any one of a first scanning signal, a second scanning signal, a reset signal and an enable signal (a control signal). A gate line GL may be connected to, for example, any one of a first scanning signal terminal GATE1, a second scanning signal terminal GATE2, a reset signal terminal RESET and an enable signal terminal EN (a control signal terminal K) of each pixel circuit of a row of pixel circuits 20.

As shown in FIG. 4, the data line DL extends substantially in the second direction Y and is configured to transmit a data signal. A data line DL may be connected to, for example, data signal terminals DATA of a column of pixel circuits 20.

As shown in FIG. 4, the first power line VDL extends substantially in the second direction Y and is configured to transmit a first power voltage signal. A first power line VDL may be connected to, for example, first voltage signal terminals VDD of a column of pixel circuits 20.

As shown in FIG. 4, the first initialization signal line VL1 extends substantially in the first direction X and is configured to transmit a first initialization signal. A first initialization signal line VL1 may be connected to, for example, first initialization signal terminals VINIT1 of a row of pixel circuits 20.

As shown in FIG. 4, the second initialization signal line VL2 extends substantially in the first direction X and is configured to transmit a second initialization signal. A second initialization signal line VL2 may be connected to, for example, second initialization signal terminals VINIT2 of a row of pixel circuits 20.

As shown in FIG. 4, the constant voltage signal line VCL extends substantially in the second direction Y and is configured to transmit a constant voltage signal. A constant voltage signal line VCL may be connected to, for example, constant voltage signal terminals VC of a column of pixel circuits 20.

As shown in FIG. 5, in a direction perpendicular to a substrate 11 and away from the substrate 11, the display panel 100 includes the substrate 11, a semiconductor layer ACT, a first gate insulating layer G11, a first gate conductive layer GT1, a second gate insulating layer G12, a second gate conductive layer GT2, an interlayer insulating layer ILD, a first source-drain conductive layer SD1, a first planarization layer PLN1, a second source-drain conductive layer SD2 and a second planarization layer PLN2.

On this basis, referring to FIGS. 4 and 5, a semiconductor channel 31 of the transistor may be located, for example, in the semiconductor layer ACT; the gate line GL, a gate 34 of the transistor and first plates of the capacitors (the first capacitor C1 and the second capacitor C2) may be located, for example, in the first gate conductive layer GT1; second plates of the capacitors (the first capacitor C1 and the second capacitor C2), the first initialization signal line VL1 and the second initialization signal line may be located, for example, in the second gate conductive layer GT2; a source 32 and a drain 33 of the transistor, the first power line VDL, and the constant voltage signal line VCL may be located, for example, in the first source-drain conductive layer SD1; the data line DL may be located, for example, in the second source-drain conductive layer SD2.

In some embodiments, as shown in FIG. 5, the display panel 100 further includes a pixel definition layer PDL; the pixel definition layer PDL is provided with a plurality of openings therein, and a light-emitting device 10 is disposed in an opening.

In some embodiments, as shown in FIG. 5, the display panel 100 further includes a spacer PS; the spacer PS may be disposed between the pixel definition layer PDL and a second electrode 12 of the light-emitting device 10 to support a mask used in the manufacturing process, so that a gap between the mask and the pixel definition layer PDL is uniform.

In some embodiments, referring to FIG. 4, the display panel 100 further has a peripheral region B, and the peripheral region B is arranged on at least a side of the display region A. FIG. 4 is illustrated by taking an example in which the peripheral region B surrounds the display region A.

As shown in FIG. 4, the peripheral region B includes a first bezel region B1, a second bezel region B2, a third bezel region B3 and a fourth bezel region B4; in the first direction X, the first bezel region B1 and the second bezel region B2 are respectively located on two opposite sides of the display region A; and in the second direction Y, the third bezel region B3 and the fourth bezel region B4 are respectively located on another two opposite sides of the display region A.

The peripheral region B is a region where no image is displayed, and the peripheral region is configured to be provided with a gate driving circuit 130 and a source driving circuit 140 therein.

Figure 10:
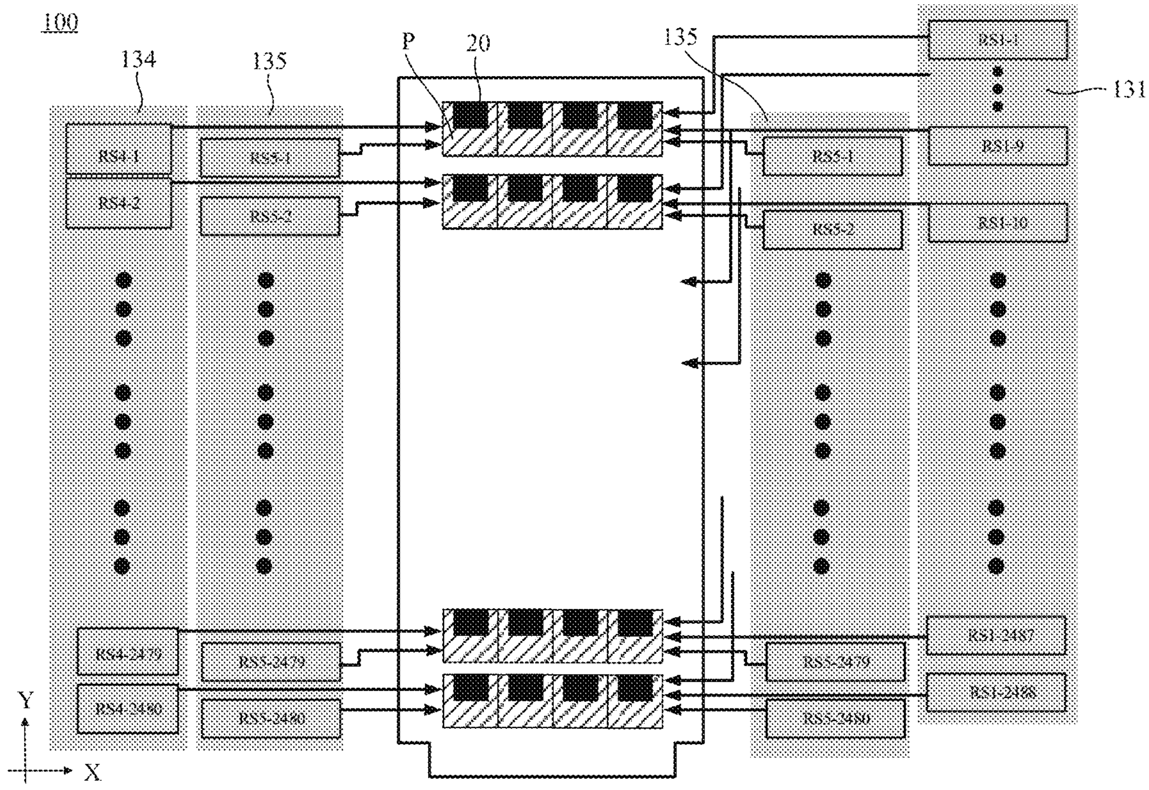
FIG. 10 is a structural diagram of a gate driving circuit of a display panel, in accordance with some embodiments.

In some embodiments, referring to FIGS. 9B and 10, the gate driving circuit 130 includes a first gate driving circuit 131; the first gate driving circuit 131 includes a plurality of first shift registers RS1 that are cascaded, each first shift register RS1 includes a first signal output terminal, and the first signal output terminal of each first shift register RS1 is connected to first scanning signal terminals GATE1 and/or reset signal terminals RESET of at least one row of pixel circuits 20.

For example, as shown in FIGS. 9B and 10, the plurality of pixel circuits 20 are arranged in M rows and N columns; each row includes N pixel circuits 20 arranged in the first direction X, and each column includes M pixel circuits 20 arranged in the second direction Y, where $M>1$, $N>1$, and M and N are both integers. Furthermore, in the second direction Y, from a first row of pixel circuits 20 to a last row of pixel circuits 20, M rows of pixel circuits 20 are respectively a 1st row of pixel circuits 20 to an M-th row of pixel circuits 20. FIG. 10 is illustrated by taking an example in which there are 2480 rows of pixel circuits 20.

The first gate driving circuit 131 includes M+Q first shift registers RS1 that are cascaded; from a first shift register RS1 at a first stage to a shift register RS1 at a last stage, the M+Q first shift registers RS1 are respectively a 1 st first shift register RS1 to an (M+Q)-th first shift register RS1. FIG. 10 is illustrated by taking an example in which Q is equal to 8.

On this basis, first scanning signal terminals GATE1 of a P-th row of pixel circuits 20 are connected to a first signal output terminal of a (P+Q)-th first shift register RS1; reset signal terminals RESET of the P-th row of pixel circuits 20 are connected to a first signal output terminal of a P-th first shift register RS1. Furthermore, $P\leq M$, $Q>0$, and P and Q are both integers.

In this way, the first gate driving circuit 131 may provide first scanning signals for first scanning signal terminals GATE1 of all the pixel circuits 20 and provide reset signals for reset signal terminals RESET of all the pixel circuits 20. That is, a first scanning signal terminal GATE1 and a reset signal terminal RESET of a pixel circuit 20 may share a gate driving circuit 130, which facilitates a narrow bezel design of the display device 1000 (referring to FIG. 1).

In some examples, as shown in FIG. 10, in the first direction X, the first gate driving circuit 131 is disposed on a side of the display region A (referring to FIG. 4), and the pixel circuits 20 are driven by the first gate driving circuit 131 row by row from a single side of the display region A (referring to FIG. 4); that is, the pixel circuits 20 are driven in a manner of single-side driving.

Figure 11:
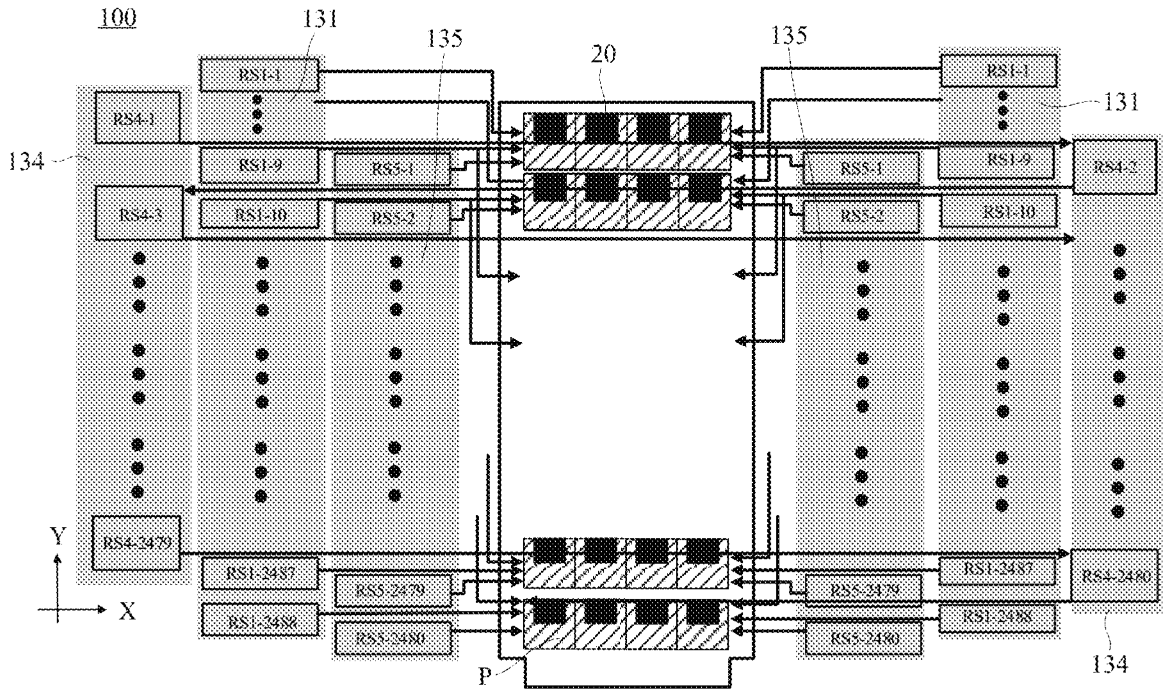
FIG. 11 is a structural diagram of a gate driving circuit of another display panel, in accordance with some embodiments.

In some other examples, as shown in FIG. 11, in the first direction X, two first gate driving circuits 131 are respectively disposed on two opposite sides of the display region A (referring to FIG. 4), and the pixel circuits 20 are driven by the two first gate driving circuits 131 row by row from two opposite sides of the display region A (referring to FIG. 4); that is, the pixel circuits 20 are driven in a manner of double-side driving.

Figure 12:
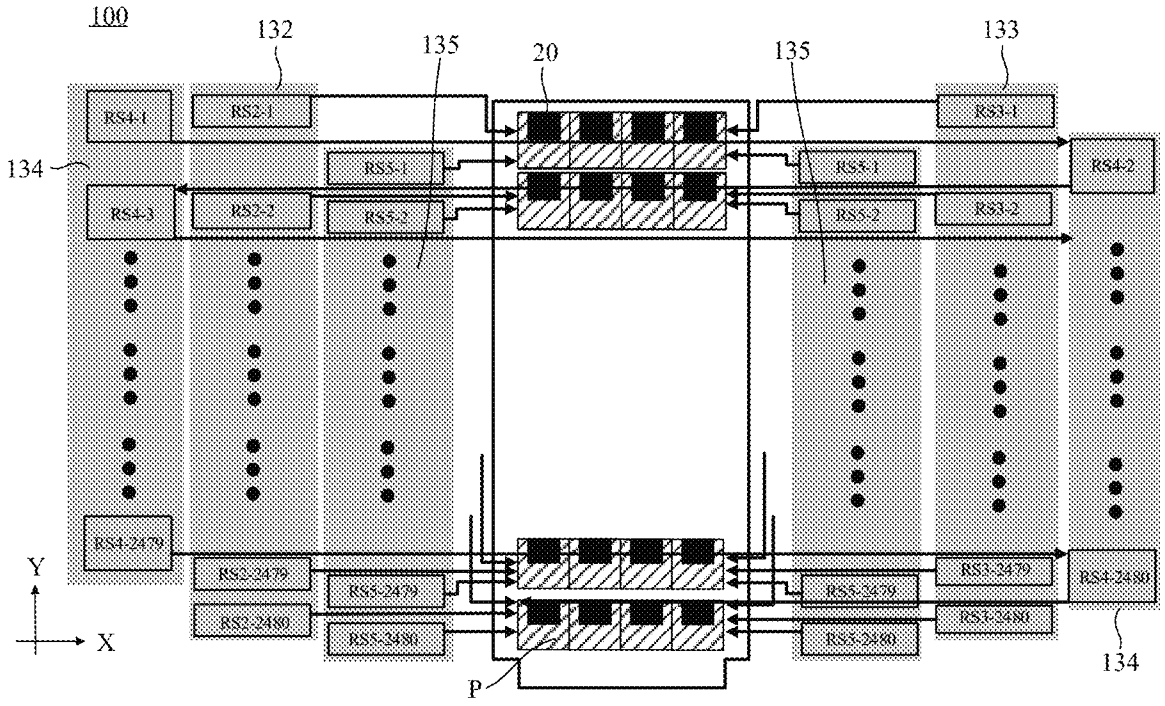
FIG. 12 is a structural diagram of a gate driving circuit of still another display panel, in accordance with some embodiments.

In some other embodiments, referring to FIG. 12, the gate driving circuit 130 includes a second gate driving circuit 132 and a third gate driving circuit 133.

As shown in FIGS. 9B and 12, the second gate driving circuit 132 includes a plurality of second shift registers RS2 that are cascaded; each second shift register RS2 includes a second signal output terminal, and the second signal output terminal of each second shift register RS2 is connected to first scanning signal terminals GATE1 of at least one row of pixel circuits 20.

For example, as shown in FIG. 12, the plurality of pixel circuits 20 are arranged in M rows and N columns; each row includes N pixel circuits 20 arranged in the first direction X, and each column includes M pixel circuits 20 arranged in the second direction Y, where M>1, N>1, and M and N are both integers. Furthermore, in the second direction Y, from a first row of pixel circuits 20 to a last row of pixel circuits 20, M rows of pixel circuits 20 are respectively a 1 st row of pixel circuits 20 to an M-th row of pixel circuits 20. FIG. 12 is illustrated by taking an example in which there are 2480 rows of pixel circuits 20.

The second gate driving circuit 132 includes M second shift registers RS2 that are cascaded; from a second shift register RS2 at a first stage to a second shift registers RS2 at a last stage, the M second shift registers RS2 are respectively a 1st second shift register RS2 to an M-th second shift register RS2. Each second shift register RS2 includes a second signal output terminal.

On this basis, first scanning signal terminals GATE1 of a P-th row of pixel circuits 20 are connected to a second signal output terminal of a P-th second shift register RS2, where P≤M, and P is an integer.

In addition, as shown in FIGS. 9B and 12, the third gate driving circuit 133 includes a plurality of third shift registers RS3 that are cascaded; each third shift register RS3 includes a third signal output terminal, and the third signal output terminal of each third shift register RS3 is connected to reset signal terminals RESET of at least one row of pixel circuits 20.

For example, as shown in FIG. 12, the plurality of pixel circuits 20 are arranged in M rows and N columns; each row includes N pixel circuits 20 arranged in the first direction X, and each column includes M pixel circuits 20 arranged in the second direction Y, where M>1, N>1, and M and N are both integers. Furthermore, in the second direction Y, from the first row of pixel circuits 20 to the last row of pixel circuits 20, the M rows of pixel circuits 20 are respectively the 1 st row of pixel circuits 20 to the M-th row of pixel circuits 20. FIG. 12 is illustrated by taking the example in which there are 2480 rows of pixel circuits 20.

The third gate driving circuit 133 includes M third shift registers RS3 that are cascaded; from a third shift register RS3 at a first stage to a third shift register RS3 at a last stage, the M third shift registers RS3 are respectively a 1 st third shift register RS3 to an M-th third shift register RS3. Each third shift register RS3 includes a third signal output terminal.

On this basis, reset signal terminals RESET of the P-th row of pixel circuits are connected to a third signal output terminal of a P-th third shift register RS3, where P≤M, and P is an integer.

In this way, the second gate driving circuit 132 may provide first scanning signals for the first scanning signal terminals GATE1 of all the pixel circuits 20, and the third gate driving circuit 133 may provide reset signals for the reset signal terminals RESET of all the pixel circuits 20. In this case, a ratio of a duration of a first scanning signal received by a first scanning signal terminal GATE1 of a pixel circuit 20 to a duration of a reset signal received by a reset signal terminal RESET of the pixel circuit 20 may be arbitrarily adjusted, which helps to alleviate the residual image phenomenon and reduce flicker, thereby improving the display quality.

In some examples, as shown in FIG. 12, in the first direction X, the second gate driving circuit 132 and the third gate driving circuit 133 are respectively disposed on two opposite sides of the display region A (referring to FIG. 4); that is, the second gate driving circuit 132 and the third gate driving circuit 133 are respectively disposed in the second bezel region B2 (referring to FIG. 4) and the first bezel region B1 (referring to FIG. 4), and the pixel circuits 20 are driven by the second gate driving circuit 132 and the third gate driving circuit 133 row by row from a single side of the display region A (referring to FIG. 4), which helps to narrow the bezel of the display device 1000 (referring to FIG. 1) to increase the screen-to-body ratio.

In some embodiments, referring to FIGS. 10 to 12, the gate driving circuit 130 further includes a fourth gate driving circuit 134.

As shown in FIGS. 9B and 10, the fourth gate driving circuit 134 includes a plurality of fourth shift registers RS4 that are cascaded; each fourth shift register RS4 includes a fourth signal output terminal, and the fourth signal output terminal of each fourth shift register RS4 is connected to enable signal terminals EM of at least one row of pixel circuits 20.

For example, as shown in FIG. 10, the plurality of pixel circuits 20 are arranged in M rows and N columns; each row includes N pixel circuits 20 arranged in the first direction X, and each column includes M pixel circuits 20 arranged in the second direction Y, where M>1, N>1, and M and N are both integers. Furthermore, in the second direction Y, from the first row of pixel circuits 20 to the last row of pixel circuits 20, the M rows of pixel circuits 20 are respectively the 1 st row of pixel circuits 20 to the M-th row of pixel circuits 20. FIG. 10 is illustrated by taking the example in which there are 2480 rows of pixel circuits 20.

The fourth gate driving circuit 134 includes M fourth shift registers RS4 that are cascaded; from a fourth shift register RS4 at a first stage to a fourth shift register RS4 at a last stage, the M fourth shift registers RS4 are respectively a 1st fourth shift register RS4 to an M-th fourth shift register RS4. Each fourth shift register RS4 includes a fourth signal output terminal.

On this basis, enable signal terminals EM of the P-th row of pixel circuits 20 are connected to a fourth signal output terminal of a P-th fourth shift register RS4 of the fourth gate driving circuit 134, where P≤M, and P is an integer.

As shown in FIG. 10, in the case where the display panel 100 includes one first gate driving circuit 131, the first gate driving circuit 131 and the fourth gate driving circuit 134 are respectively disposed in the first bezel region B1 (referring to FIG. 4) and the second bezel region B2 (referring to FIG. 4), which facilitates the narrow bezel design of the display device 1000 (referring to FIG. 1).

As shown in FIG. 11, in the case where the display panel 100 includes two first gate driving circuits 131 and the two first gate driving circuits 131 are respectively disposed in the first bezel region B1 and the second bezel region B2, odd-numbered fourth shift registers RS4 and even-numbered fourth shift registers RS4 may be respectively disposed in the second bezel region B2 and the first bezel region B1 to drive the pixel circuits in a manner of alternating driving, so as to make full use of the regions of the first bezel region B1 and the second bezel region B2 to improve the uniformity of the displayed images.

As shown in FIG. 12, in the case where the display panel 100 includes the second gate driving circuit 132 and the third gate driving circuit 133, the odd-numbered fourth shift registers RS4 and the even-numbered fourth shift registers RS4 are respectively disposed in the second bezel region B2 and the first bezel region B1 to drive the pixel circuits in a manner of alternating driving, so as to make full use of the regions of the first bezel region B1 and the second bezel region B2 to improve the uniformity of the displayed images.

In some embodiments, referring to FIGS. 10 to 12, the gate driving circuit 130 further includes a fifth gate driving circuit 135.

As shown in FIGS. 9B and 12, the fifth gate driving circuit 135 includes a plurality of fifth shift registers RS5 that are cascaded; each fifth shift register RS5 includes a fifth signal output terminal, and the fifth signal output terminal of each fifth shift register RS5 is connected to second scanning signal terminals GATE2 of at least one row of pixel circuits 20.

For example, as shown in FIG. 12, the plurality of pixel circuits 20 are arranged in M rows and N columns; each row includes N pixel circuits 20 arranged in the first direction X, and each column includes M pixel circuits 20 arranged in the second direction Y, where M>1, N>1, and M and N are both integers. Furthermore, in the second direction Y, from the first row of pixel circuits 20 to the last row of pixel circuits 20, the M rows of pixel circuits 20 are respectively the 1 st row of pixel circuits 20 to the M-th row of pixel circuits 20. FIG. 12 is illustrated by taking the example in which there are 2480 rows of pixel circuits 20.

The fifth gate driving circuit 135 includes M fifth shift registers RS5 that are cascaded; from a fifth shift register RS5 at a first stage to a fifth shift register RS5 at a last stage, the M fifth shift registers RS5 are respectively a 1 st fifth shift register RS5 to an M-th fifth shift register RS5. Each fifth shift register RS5 includes a fifth signal output terminal.

On this basis, second scanning signal terminals GATE2 of the P-th row of pixel circuits 20 are connected to a fifth signal output terminal of a P-th fifth shift register RS5 of the fifth gate driving circuit 135, where P≤M, and P is an integer.

In some examples, as shown in FIGS. 10 to 12, the display panel 100 includes two fifth gate driving circuits 135, and the two fifth gate driving circuits 135 are respectively disposed in the first bezel region B1 (referring to FIG. 4) and the second bezel region B2 (referring to FIG. 4). That is, the second scanning signal terminals GATE2 of the P-th row of pixel circuits 20 are connected to two fifth signal output terminals of two P-th fifth shift registers RS5 of the two fifth gate driving circuits 135 to drive the pixel circuits 20 in a manner of a double-side driving, where P≤M, and P is an integer. With this arrangement, the influence of voltage drop on the second scanning signal may be reduced, thereby improving the brightness uniformity of the display screen.

Some embodiments of the present disclosure provide a driving method of a pixel circuit 20, which is used to drive the pixel circuit 20 in any one of the above embodiments.

As shown in FIG. 13, a display frame F includes a refresh frame F1, and the refresh frame F1 includes a first reset phase P11 and a second reset phase P12.

Referring to FIG. 9B, in the first reset phase P11, the reset sub-circuit 23 transmits a first initialization signal received at the first initialization signal terminal VINIT1 to the first node N1 to reset the first node N1 in response to an operating voltage of a reset signal of the reset signal terminal RESET; in addition, the storage sub-circuit 24 stores a voltage of the second node N2 after the previous frame ends, so that the second node N2 may be at a stable potential (a voltage of the first voltage signal).

That is, as shown in FIG. 9B, the fifth transistors T5 are turned on under control of the reset signal received at the reset signal terminal RESET to transmit the first initialization signal received at the first initialization signal terminal VINIT1 to the first node N1. In addition, the second storage capacitor C2 stores the voltage of the second node N2 after the previous frame ends.

In this case, in the first reset phase P11, a great bias voltage may be generated between the second node N2 and the first node N1, i.e., a stable and great bias voltage is generated between the source and the control electrode of the eighth transistor T8, which ameliorates the hysteresis characteristic of the eighth transistor T8, thereby alleviating the residual image phenomenon of the sub-pixel P, and reducing the flicker value of the display panel 100 to alleviate the problem that human eyes can perceive the flicker of the display screen.

It will be noted that, a time interval between a start time of the first reset phase P11 and a start time of the display frame F to which the first reset phase P11 belongs is greater than or equal to two row scanning periods H, so as to prevent the first reset phase P11 from being affected by an overlapping of rising edges and falling edges of various signals at an end of the previous display frame F and in the first reset phase P11.

Referring to FIG. 9B, in the second reset phase P12, the reset sub-circuit 23 transmits the first initialization signal received at the first initialization signal terminal VINIT1 to the first node N1 in response to the operating voltage of the reset signal of the reset signal terminal RESET; the compensation sub-circuit 22 transmits the voltage of the first node N1 to the third node N3 in response to an operating voltage of the first scanning signal received at the first scanning signal terminal GATE1, and the driving sub-circuit 21 transmits a voltage of the third node N3 to the second node N2 under control of the voltage of the first node N1. In this way, the third node N3 and the second node N2 are reset in sequence.

That is, as shown in FIG. 9B, the first sub-transistor T1-1 and the second sub-transistor T1-2 are turned on under control of the first scanning signal received at the first scanning signal terminal GATE1 and transmit the voltage of the first node N1 to the third node N3; in addition, the eighth transistor T8 is turned on under the control of the voltage of the first node N1 to transmit the voltage of the third node N3 to the second node N2.

In this case, in the second reset phase P12, the second node N2 and the third node N3 may be reset to reduce the influence of residual voltage of the previous frame on data writing of the current frame, thereby improving the brightness uniformity of the display screen.

In some embodiments, as shown in FIG. 13, the refresh frame F1 further includes a first data writing phase P21 and a second data writing phase P22.

In the first data writing phase P21, the data writing sub-circuit 27 transmits a data signal received at the data signal terminal DATA to the second node N2 in response to a first operating voltage of a second scanning signal received at the second scanning signal terminal GATE2; the driving sub-circuit 21 transmits the voltage of the second node N2 to the third node N3 under the control of the voltage of the first node N1; and the compensation sub-circuit 22 transmits the voltage of the third node N3 to the first node N1 in response to the operating voltage of the first scanning signal received at the first scanning signal terminal GATE1.

That is, as shown in FIG. 9B, the seventh transistor T7 is turned on under control of the first operating voltage of the second scanning signal received at the second scanning signal terminal GATE2 to transmit the data signal received at the data signal terminal DATA to the second node N2, and the second storage capacitor C2 stores a voltage of the data signal transmitted by the second node N2.

In addition, the eighth transistor T8 is turned on under the control of the voltage of the first node N1 to transmit the voltage of the second node N2 to the third node N3; the first sub-transistor T1-1 and the second sub-transistor T1-2 are turned on under the control of the operating voltage of the first scanning signal received at the first scanning signal terminal GATE1 to transmit the voltage of the third node N3 to the first node N1.

In this case, in the first data writing phase P21, the data signal may be transmitted to the first node N1 and the second storage capacitor C2.

In the second data writing phase P22, the storage sub-circuit 24 is discharged to transmit the stored data signal to the second node N2; the driving sub-circuit 21 transmits the voltage of the second node N2 to the third node N3 under the control of the voltage of the first node N1; and the compensation sub-circuit 22 transmits the voltage of the third node N3 to the first node N1 in response to the operating voltage of the first scanning signal received at the first scanning signal terminal GATE1.

That is, as shown in FIG. 9B, the second storage capacitor C2 is discharged to transmit the data signal written in the first data writing phase P21 to the second node N2; the eighth transistor T8 is turned on under the control of the voltage of the first node N1 to transmit the voltage of the second node N2 to the third node N3; the first sub-transistor T1-1 and the second sub-transistor T1-2 are turned on under the control of the operating voltage of the first scanning signal received at the first scanning signal terminal GATE1 to transmit the voltage of the third node N3 to the first node N1.

In this case, in the second data writing phase P22, the second storage capacitor C2 may be continuously discharged to continuously transmit the data signal to the first node N1 so as to increase the duration of data writing, thereby facilitating the improvement of the brightness uniformity of the display screen to improve the display effect.

In some embodiments, as shown in FIGS. 9B and 13, the transistors included in the compensation sub-circuit 22 are P-type transistors, and the second reset phase P12 includes at least 3 row scanning periods H.

In the second reset phase P12, an operating voltage of the first scanning signal in a first row scanning period H is greater than an operating voltage of the first scanning signal in a second row scanning period H. That is, a stability of a first scanning signal output in an even-numbered row scanning period H is greater than a stability of a first scanning signal output in an odd-numbered row scanning period H.

For example, a first scanning signal of a first signal output terminal of a first shift register RS1 is output by a clock signal line; in the first row scanning period H of the second reset phase P12, the first signal output terminal outputs a high level signal from the clock signal line; and in the second row scanning period H of the second reset phase P12, the first signal output terminal outputs a low level signal from the clock signal line.

In addition, in other odd-numbered row scanning periods H in the second reset phase P12, the first signal output terminal is in a floating state; and in other even-numbered row scanning periods H in the second reset phase P12, the first signal output terminal outputs a low level signal from the clock signal line. In this case, the stability of the first scanning signal output in the even-numbered row scanning period H is greater than the stability of the first scanning signal output in the odd-numbered row scanning period H.

On this basis, the first data writing phase P21 is after the second reset phase P12 and coincides with a 2N-th row scanning period H after a start time of the second reset phase P12, where N≥2, and N is an integer.

In this case, the first data writing phase P21 is within an even-numbered row scanning period H in which the stability of the first scanning signal is high, which may improve the accuracy of writing the data signal, thereby improving the brightness uniformity of the display screen. In particular, in the case where the display panel 100 includes the first gate driving circuit 131, this design may reduce the risk of last few rows of sub-pixels P being brighter than other sub-pixels P, thereby improving the brightness uniformity of the display screen.

For example, as shown in FIG. 13, the second reset phase P12 includes 3 row scanning periods H. In this case, the first data writing phase P21 coincides with a 6th row scanning period H after the start time of the second reset phase P12; that is, the first data writing phase P21 is within the sixth row scanning period H in which the stability of the first scanning signal is high.

Furthermore, a falling edge of the second scanning signal and a rising edge of the reset signal may be staggered by two row scanning periods H, so that the second reset phase P12 is prevented from affecting data writing, and the brightness uniformity of the display screen is high.

In some embodiments, as shown in FIG. 13, the refresh frame F1 further includes a first light-emitting phase P3.

In the first light-emitting phase P3, the light-emitting control sub-circuit 26 transmits a first voltage signal received at the first voltage signal terminal VDD to the second node N2 in response to an enable signal received at the enable signal terminal EM; the driving sub-circuit 21 generates a driving current signal based on the voltage of the first node N1 and the voltage of the second node N2.

Furthermore, the light-emitting control sub-circuit 26 transmits the driving current signal to the light-emitting device 10 in response to an operating voltage of the enable signal received at the enable signal terminal EM; the leakage prevention sub-circuit 25 transmits a constant voltage signal received at the constant voltage terminal VC to the fourth node N4 in response to an operating voltage of a control signal received at the control signal terminal K.

That is, as shown in FIG. 9B, the third transistor T3 is turned on under control of the enable signal received at the enable signal terminal EM to transmit the first voltage signal received at the first voltage signal terminal VDD to the second node N2; the eighth transistor T8 generates the driving current signal based on the voltage of the first node N1 and the voltage of the second node N2.

Furthermore, the third transistor T3 and the fourth transistor T4 are both turned on under the control of the enable signal received at the enable signal terminal EM to transmit the driving current signal to the light-emitting device 10 to drive the light-emitting device 10 to emit light; the second transistor T2 is turned on under the control of the enable signal received at the enable signal terminal EM to transmit the constant voltage signal received at the constant voltage terminal VC to the fourth node N4, thereby reducing the leakage current of the first node N1 to improve the brightness uniformity of the display screen.

On this basis, as shown in FIG. 13, the refresh frame F1 may further include a third reset phase P13, and the third reset phase P13 is between the second data writing phase P22 and the first light-emitting phase P3.

Referring to FIG. 9B, in the third reset phase P13, the data writing sub-circuit 27 transmits a data refresh signal received at the data signal terminal DATA to the second node N2 in response to a second operating voltage of the second scanning signal received at the second scanning signal terminal GATE2.

That is, as shown in FIG. 9B, the seventh transistor T7 is turned on under control of the second scanning signal received at the second scanning signal terminal GATE2 to transmit the data refresh signal received at the data signal terminal DATA to the second node N2, so that it is possible to reset the second node N2 and the fourth node N4 again by using a data signal received by a pixel circuit 20 in other rows to improve the brightness uniformity of the display screen. Thus, there is no need to change the circuit structure, and the structure is simple.

In some examples, referring to FIGS. 13, 14 and 15, a time interval between a start time of the third reset phase P13 and an end time of the second data writing phase P22 is greater than or equal to 1 row scanning period H, so that the risk of data writing or resetting being affected by an overlapping between rising edges and falling edges of various signals in the third reset phase P13 and second data writing phase P22 may be reduced.

For example, as shown in FIG. 13, the time interval between the start time of the third reset phase P13 and the end time of the second data writing phase P22 is 2 row scanning periods H, so that the situation in which data writing or resetting is affected by the overlapping between rising edges and falling edges of various signals in the third reset phase P13 and second data writing phase P22 is avoided.

In some examples, referring to FIGS. 13, 14 and 15, a time interval between an end time of the third reset phase P13 and a start time of the first light-emitting phase P3 is greater than or equal to one row scanning period H, so that a situation in which data writing or light emission is affected by an overlapping between rising edges and falling edges of various signals in the third reset phase P13 and first light-emitting phase P3 is avoided.

For example, as shown in FIG. 13, the time interval between the start time of the first light-emitting phase P3 and the end time of the third reset phase P13 is 1 row scanning period H, so that the situation in which data writing or light emission is affected by the overlapping between rising edges and falling edges of various signals in the third reset phase P13 and the first light-emitting phase P3 is avoided.

In some embodiments, referring to FIGS. 9B and 13, the pixel circuit 20 is driven at a first refresh rate and a second refresh rate, and the second refresh rate is less than the first refresh rate. In a case where the pixel circuit 20 is driven at the first refresh rate, a display frame F includes a refresh frame F1. In a case where the pixel circuit 20 is driven at the second refresh rate, a display frame F includes a refresh frame F1 and at least one holding frame F2.

In this case, the display panel 100 may display images at different refresh rates such as 30 Hz, 40 Hz, 60 Hz and 120 Hz, or at different refresh rates such as 40 Hz, 55 Hz, 82 Hz and 165 Hz, but the embodiments of the present disclosure are not limited thereto.

As shown in FIG. 13, the holding frame F2 includes a black frame insertion phase P4, a fourth reset phase P5 and a second light-emitting phase P6.

In the black frame insertion phase P4, the light-emitting control sub-circuit 26 is configured to control a circuit branch transmitting the driving current signal to be opened in response to a non-operating voltage of the enable signal received at the enable signal terminal EM.

That is, as shown in FIG. 9B, the third transistor T3 and the fourth transistor T4 are turned off under the control of the enable signal received at the enable signal terminal EM to control the circuit branch transmitting the driving current signal to be opened.

In this case, after the first light-emitting phase P3 in the refresh frame F1, a black frame may be inserted to provide a break time for the light-emitting device 10, which may avoid abnormal light emission of the light-emitting device 10 due to being under a bias voltage for a long time, thereby improving the image display effect and prolonging the service life of the light-emitting device 10.

In the fourth reset phase P5, the data writing sub-circuit 27 transmits a data holding signal received at the data signal terminal DATA to the second node N2 in response to a third operating voltage of the second scanning signal received at the second scanning signal terminal GATE2.

It will be noted that, a voltage of the data holding signal is in a range of 0 V to $V_{GMP}$, where $V_{GMP}$ refers to a black-state voltage of the sub-pixel P; the black-state voltage means that in a case where a target grayscale of the sub-pixel P is 0, the black-state voltage is directly used as a driving voltage of the sub-pixel P, so that the corresponding sub-pixel does not emit light. For example, the voltage of the data holding signal is in a range of 0 V to 7 V; for example, the voltage of the data holding signal is any one of 0 V, 1 V, 2 V, 3 V, 4 V, 5 V, 6 V and 7 V. Here, the voltage value of the data holding signal may be determined based on experiments and tests, and a voltage value having a low flicker value may be used as the actual voltage value of the data holding signal, which is not specifically limited in the embodiments of the present disclosure.

That is, as shown in FIG. 9B, the seventh transistor T7 is turned on under the control of the second scanning signal received at the second scanning signal terminal GATE2 to transmit the data holding signal received at the data signal terminal DATA to the second node N2 to reset the second node N2

In the second light-emitting phase P6, the light-emitting control sub-circuit 26 transmits the first voltage signal received at the first voltage signal terminal VDD to the second node N2 in response to an operating voltage of the enable signal received at the enable signal terminal EM; the driving sub-circuit 21 generates a driving current signal based on the voltage of the first node N1 and the voltage of the second node N2.

Furthermore, the light-emitting control sub-circuit 26 transmits the driving current signal to the light-emitting device 10 in response to the operating voltage of the enable signal received at the enable signal terminal EM; the leakage prevention sub-circuit 25 transmits the constant voltage signal received at the constant voltage terminal VC to the fourth node N4 in response to an operating voltage of the control signal received at the control signal terminal K.

That is, as shown in FIG. 9B, the third transistor T3 is turned on under the control of the enable signal received at the enable signal terminal EM to transmit the first voltage signal received at the first voltage signal terminal VDD to the second node N2; the eighth transistor T8 generates the driving current signal based on the voltage of the first node N1 and the voltage of the second node N2.

Furthermore, the third transistor T3 and the fourth transistor T4 are both turned on under the control of the enable signal received at the enable signal terminal EM to transmit the driving current signal to the light-emitting device 10 to drive the light-emitting device 10 to emit light; the second transistor T2 is turned on under the control of the enable signal received at the enable signal terminal EM to transmit the constant voltage signal received at the constant voltage terminal VC to the fourth node N4, thereby reducing the leakage current of the first node N1 to improve the brightness uniformity of the display screen.

In some examples, referring to FIGS. 13, 14 and 15, a time interval between an end time of the fourth reset phase P5 and a start time of the second light-emitting phase P6 is greater than or equal to one row scanning period H, so that a situation in which resetting or light emission is affected by an overlapping between rising edges and falling edges of various signals in the fourth reset phase P5 and second light-emitting phase P6 is avoided.

For example, as shown in FIG. 13, the time interval between the end time of the fourth reset phase P5 and the start time of the second light-emitting phase P6 is one row scanning period H, so that the situation in which resetting or light emission is affected by the overlapping between rising edges and falling edges of various signals in the fourth reset phase P5 and second light-emitting phase P6 is avoided.

The above are only specific embodiments of the present disclosure, but the protection scope of the present disclosure is not limited thereto, and variations or substitutions that any person skilled in the art may conceive of within the technical scope of the present disclosure should all fall within the protection scope of the present disclosure. Therefore, the protection scope of the present disclosure should be determined by the protection scope of the claims.

The invention claimed is:

1. A pixel circuit, comprising:

a driving sub-circuit coupled to a first node, a second node and a third node, wherein the driving sub-circuit is configured to control a circuit branch between the second node and the third node to be closed and opened under control of a voltage of the first node;

a compensation sub-circuit coupled to a first scanning signal terminal, the first node and the third node, wherein the compensation sub-circuit is configured to control a circuit branch between the first node and the third node to be closed and opened in response to a first scanning signal received at the first scanning signal terminal;

a reset sub-circuit coupled to a first initialization signal terminal, a reset signal terminal and the first node, wherein the reset sub-circuit is configured to transmit a first initialization signal received at the first initialization signal terminal to the first node in response to an operating voltage of a reset signal received at the reset signal terminal; and a storage sub-circuit coupled to a first voltage signal terminal, the first node and the second node, wherein the storage sub-circuit is configured to store voltages of the first node and the second node.

2. A driving method of a pixel circuit used to drive the pixel circuit according to claim 1, wherein a display frame includes a refresh frame, and the refresh frame includes a first reset phase and a second reset phase; and the driving method comprises:

in the first reset phase, the reset sub-circuit transmitting the first initialization signal received at the first initialization signal terminal to the first node in response to the operating voltage of the reset signal of the reset signal terminal, and the storage sub-circuit storing a voltage of the second node after a previous frame ends; and in the second reset phase, the reset sub-circuit transmitting the first initialization signal received at the first initialization signal terminal to the first node in response to the operating voltage of the reset signal of the reset signal terminal, the compensation sub-circuit transmitting a voltage of the first node to the third node in response to an operating voltage of the first scanning signal received at the first scanning signal terminal, and the driving sub-circuit transmitting a voltage of the third node to the second node under control of the voltage of the first node.

3. The driving method according to claim 2, wherein the pixel circuit further includes a data writing sub-circuit coupled to a data signal terminal, a second scanning signal terminal and the second node, and the refresh frame further includes a first data writing phase and a second data writing phase; and the driving method further comprises:

in the first data writing phase, the data writing sub-circuit transmitting a data signal received at the data signal terminal to the second node in response to a first operating voltage of a second scanning signal received at the second scanning signal terminal, the driving sub-circuit transmitting a voltage of the second node to the third node under the control of the voltage of the first node, and the compensation sub-circuit transmitting a voltage of the third node to the first node in response to the operating voltage of the first scanning signal received at the first scanning signal terminal; and in the second data writing phase, the storage sub-circuit performing a discharge to transmit a stored data signal to the second node, the driving sub-circuit transmitting a voltage of the second node to the third node under the control of a voltage of the first node, and the compensation sub-circuit transmitting a voltage of the third node to the first node in response to the operating voltage of the first scanning signal received at the first scanning signal terminal.

4. The driving method according to claim 3, wherein the refresh frame further includes a third reset phase and a light-emitting phase, and the third reset phase is between the second data writing phase and the first light-emitting phase; and the driving method further comprises:

in the third reset phase, the data writing sub-circuit transmitting a data refresh signal received at the data signal terminal to the second node in response to a second operating voltage of the second scanning signal received at the second scanning signal terminal.

5. The driving method according to claim 4, wherein a time interval between a start time of the third reset phase and an end time of the second data writing phase is greater than or equal to one row scanning period, and/or a time interval between an end time of the third reset phase and a start time of the first light-emitting phase is greater than or equal to one row scanning period.

6. The driving method according to claim 3, wherein transistors included in the compensation sub-circuit are P-type transistors; the second reset phase includes at least 3 row scanning periods;

in the second reset phase, an operating voltage of the first scanning signal in a first row scanning period is greater than an operating voltage of the first scanning signal in a second row scanning period; and the first data writing phase is after the second reset phase and coincides with a 2N-th row scanning period after a start time of the second reset phase, wherein $N \geq 2$, and N is an integer.

7. The driving method according to claim 2, wherein the pixel circuit further includes a data writing sub-circuit, a leakage prevention sub-circuit and a light-emitting control sub-circuit; the pixel circuit is driven at a first refresh rate and a second refresh rate, and the second refresh rate is less than the first refresh rate; at the first refresh rate, the display frame includes the refresh frame; at the second refresh rate, the display frame includes the refresh frame and at least one holding frame; a holding frame includes a black frame insertion phase, a fourth reset phase and a second light-emitting phase; and the driving method further comprises:

in the black frame insertion phase, the light-emitting control sub-circuit controlling a circuit branch transmitting a driving current signal to be opened in response to a non-operating voltage of an enable signal received at an enable signal terminal;

in the fourth reset phase, the data writing sub-circuit transmitting a data holding signal received at a data signal terminal to the second node in response to a third operating voltage of a second scanning signal received at a second scanning signal terminal; and in the second light-emitting phase, the light-emitting control sub-circuit transmitting a first voltage signal received at the first voltage signal terminal to the second node in response to an operating voltage of the enable signal received at the enable signal terminal, the driving sub-circuit generating a driving current signal based on a voltage of the first node and a voltage of the second node, the light-emitting control sub-circuit transmitting the driving current signal to a light-emitting device in response to the operating voltage of the enable signal received at the enable signal terminal; and the leakage prevention sub-circuit transmitting a constant voltage signal received at a constant voltage terminal to a fourth node in response to an operating voltage of a control signal received at a control signal terminal.

8. The driving method according to claim 7, wherein a time interval between an end time of the fourth reset phase and a start time of the second light-emitting phase is greater than or equal to one row scanning period.

9. The pixel circuit according to claim 1, further comprising:

a data writing sub-circuit coupled to a data signal terminal, a second scanning signal terminal and the second node, wherein the data writing sub-circuit is configured to transmit a data signal received at the data signal terminal to the second node in response to a first operating voltage of a second scanning signal received at the second scanning signal terminal and transmit a data refresh signal received at the data signal terminal to the second node in response to a second operating voltage of the second scanning signal received at the second scanning signal terminal; the data refresh signal is a data signal received by a pixel circuit in another row.

10. The pixel circuit according to claim 9, wherein an end time of the first operating voltage of the second scanning signal is prior to an end time of an operating voltage of the first scanning signal; and a time interval between the end time of the first operating voltage of the second scanning signal and the end time of the operating voltage of the first scanning signal is greater than or equal to one row scanning period, wherein the row scanning period is a duration of an operating voltage of the second scanning signal; and/or a start time of the first operating voltage of the second scanning signal is after an end time of the operating voltage of the reset signal; and a time interval between the start time of the first operating voltage of the second scanning signal and the end time of the operating voltage of the reset signal is greater than or equal to 1 row scanning period, wherein the row scanning period is a duration of an operating voltage of the second scanning signal.

11. The pixel circuit according to claim 9, wherein the pixel circuit further comprises a light-emitting control sub-circuit coupled to the first voltage signal terminal, an enable signal terminal, the second node, the third node and a fifth node, wherein the fifth node is configured to be connected to an anode of a light-emitting device; the light-emitting control sub-circuit is configured to, in response to an enable signal received at the enable signal terminal, control a circuit brand between the first voltage signal terminal and the second node to be closed and opened and control a circuit branch between the first voltage signal terminal and the second node to be closed and opened and control a circuit brand between the third node and the fifth node to be closed and opened; a start time and an end time of the second operating voltage of the second scanning signal are both between an end time of an operating voltage of the first scanning signal and a start time of an operating voltage of the enable signal; and a time interval between the start time of the second operating voltage of the second scanning signal and the end time of the operating voltage of the first scanning signal is greater than or equal to one row scanning period; and a time interval between the end time of the second operating voltage of the second scanning signal and the start time of the operating voltage of the enable signal is greater than or equal to one row scanning period; wherein the row scanning period is a duration of an operating voltage of the second scanning signal.

12. The pixel circuit according to claim 9, wherein the data writing sub-circuit is further configured to transmit a data holding signal received at the data signal terminal to the second node in response to a third operating voltage of the second scanning signal received at the second scanning signal terminal.

13. The pixel circuit according to claim 9, wherein the reset sub-circuit is further coupled to a second initialization signal terminal, a third scanning signal terminal and a fifth node connected to an anode of a light-emitting device; the reset sub-circuit is further configured to transmit a second initialization signal received at the second initialization signal terminal to the fifth node under control of an operating voltage of a third scanning signal received at the third scanning signal terminal.

14. A display panel, comprising:

a plurality of pixel circuits each according to claim 1; the plurality of pixel circuits are arranged in M rows and N columns, each row includes N pixel circuits arranged in a first direction, and each column includes M pixel circuits arranged in a second direction substantially perpendicular to the first direction, wherein M>1, N>1, and M and N are both integers.

15. The display panel according to claim 14, wherein in the second direction, from a first row of pixel circuits to a last row of pixel circuits, the M rows of pixel circuits are respectively a 1st row of pixel circuits to an M-th row of pixel circuits; and the display panel further comprises:

a first gate driving circuit including M+Q first shift registers that are cascaded, wherein from a first shift register at a first stage to a shift register at a last stage, the M+Q first shift registers are respectively a 1st first shift register to an (M+Q)-th first shift register; each first shift register includes a first signal output terminal;

wherein first scanning signal terminals of a P-th row of pixel circuits are connected to a first signal output terminal of a (P+Q)-th first shift register; reset signal terminals of the P-th row of pixel circuits are connected to a first signal output terminal of a P-th first shift register, wherein P≤M, Q>0, and P and Q are both integers.

16. The display panel according to claim 14, wherein in the second direction, from a first row of pixel circuits to a last row of pixel circuits, the M rows of pixel circuits are respectively a 1st row of pixel circuits to an M-th row of pixel circuits; and the display panel further comprises:

a second gate driving circuit including M second shift registers that are cascaded, wherein from a second shift register at a first stage to a second shift registers at a last stage, the M second shift registers are respectively a 1st second shift register to an M-th second shift register; each second shift register includes a second signal output terminal; wherein first scanning signal terminals of a P-th row of pixel circuits are connected to a second signal output terminal of a P-th second shift register, wherein P≤M, and P is an integer; and a third gate driving circuit including M third shift registers that are cascaded, wherein from a third shift register at a first stage to a third shift register at a last stage, the M third shift registers are respectively a 1st third shift register to an M-th third shift register; each third shift register includes a third signal output terminal; wherein reset signal terminals of the P-th row of pixel circuits are connected to a third signal output terminal of a P-th third shift register, wherein P≤M, and P is an integer.

17. A display device, comprising:

the display panel according to claim 14.

18. The pixel circuit according to claim 1, wherein the storage sub-circuit includes:

a first storage capacitor, wherein a first plate of the first storage capacitor is connected to the first voltage signal terminal, and a second plate of the first storage capacitor is connected to the first node; and a second storage capacitor, wherein a first plate of the second storage capacitor is connected to the first voltage signal terminal, and a second plate of the second storage capacitor is connected to the second node.

19. The pixel circuit according to claim 1, wherein the compensation sub-circuit includes:

a first sub-transistor and a second sub-transistor that are connected in series, wherein a first electrode of the first sub-transistor is connected to the first node, a second electrode of the first sub-transistor and/or a first electrode of the second sub-transistor is connected to a fourth node, a second electrode of the second sub-transistor is connected to the third node, and control electrodes of the first sub-transistor and the second sub-transistor are connected to the first scanning signal terminal;

wherein the pixel circuit further comprises:

a leakage prevention sub-circuit coupled to a control signal terminal, a constant voltage terminal and the fourth node, wherein the leakage prevention sub-circuit is configured to transmit a constant voltage signal received at the constant voltage terminal to the fourth node in response to an operating voltage of a control signal received at the control signal terminal.

20. The pixel circuit according to claim 1, wherein a start time of the operating voltage of the reset signal is prior to a start time of an operating voltage of the first scanning signal, and a time interval between the start time of the operating voltage of the reset signal and the start time of the operating voltage of the first scanning signal is greater than or equal to 3 row scanning periods; and/or an end time of the operating voltage of the reset signal is after the start time of the operating voltage of the first scanning signal, and a time interval between the end time of the operating voltage of the reset signal and the start time of the operating voltage of the first scanning signal is greater than or equal to 2 row scanning periods.

* * * * *